(12) United States Patent
Guy et al.

(10) Patent No.: US 9,938,698 B2
(45) Date of Patent: Apr. 10, 2018

(54) FLUID LEAK DETECTION AND SHUTDOWN APPARATUS

(71) Applicants: Kevin Duane Guy, Yuma, CO (US); John Elm, Crested Butte, CO (US)

(72) Inventors: Kevin Duane Guy, Yuma, CO (US); John Elm, Crested Butte, CO (US)

( * ) Notice: Subject to any disclaimer, the term of this patent is extended or adjusted under 35 U.S.C. 154(b) by 0 days.

(21) Appl. No.: 15/182,484

(22) Filed: Jun. 14, 2016

(65) Prior Publication Data

US 2016/0289929 A1 Oct. 6, 2016

Related U.S. Application Data

(63) Continuation-in-part of application No. 14/224,059, filed on Mar. 24, 2014, now abandoned, which is a continuation-in-part of application No. 13/272,219, filed on Oct. 13, 2011, now Pat. No. 8,720,481.

(51) Int. Cl.
| | |
|---|---|
| *F16K 31/06* | (2006.01) |
| *E03B 7/07* | (2006.01) |
| *F17D 5/06* | (2006.01) |
| *F17D 5/02* | (2006.01) |
| *G01M 3/28* | (2006.01) |

(52) U.S. Cl.
CPC .............. *E03B 7/071* (2013.01); *F17D 5/02* (2013.01); *F17D 5/06* (2013.01); *G01M 3/2807* (2013.01); *Y10T 137/7759* (2015.04)

(58) Field of Classification Search
CPC .. F17D 5/02; F17D 5/06; E03B 7/071; G01M 3/2807; Y10T 137/7759; Y10T 137/7761; Y10T 137/7837; Y10T 137/86397; Y10T 137/86405; Y10T 137/86413; Y10T 137/8208; Y10T 137/87265
USPC ...... 137/486, 487.5, 624.11, 624.13, 624.14, 137/552.7, 511, 599.1, 599.13, 601.2, 137/601.18, 599.01
See application file for complete search history.

(56) References Cited

U.S. PATENT DOCUMENTS

| | | | | |
|---|---|---|---|---|
| 2,773,251 | A * | 12/1956 | Snyder ..................... | E03C 1/106 137/487.5 |
| 3,416,560 | A * | 12/1968 | Bruno ................... | F15B 20/005 137/456 |
| 4,589,435 | A * | 5/1986 | Aldrich ................... | F16K 21/16 137/102 |

(Continued)

*Primary Examiner* — Mary McManmon
*Assistant Examiner* — Minh Le
(74) *Attorney, Agent, or Firm* — Roger A. Jackson

(57) ABSTRACT

An apparatus and method for a fluid leak detection and shutdown for a fluid distribution system having a total system flow rate. The apparatus includes a solenoid shutoff valve having a normally open state and an activated closed state with a flow capacity matched to the total fluid distribution system flow rate. The apparatus also has a primary fluid flow line and a smaller capacity secondary fluid flow line. The apparatus includes a flow sensor in fluid communication with the secondary fluid flow line, wherein the flow sensor has a perceptible output and a flow rate capacity less than the solenoid shutoff flow capacity. Operationally, the flow sensor receives a portion of the solenoid shutoff valve flow capacity in priority over the primary fluid flow line, allowing the flow sensor to detect minimal flow rates and using the perceptible output to activate the solenoid shutoff valve into the closed state.

12 Claims, 23 Drawing Sheets

(56) References Cited

U.S. PATENT DOCUMENTS

| | | | | |
|---|---|---|---|---|
| 5,056,554 | A | * | 10/1991 | White .................... E03B 7/12 137/312 |
| 5,415,033 | A | | 5/1995 | Maresca, Jr. et al. |
| 5,568,825 | A | * | 10/1996 | Faulk ................... E03B 7/071 137/486 |
| 5,637,789 | A | * | 6/1997 | Lawson ............... G01M 3/002 340/606 |
| 5,971,011 | A | * | 10/1999 | Price .................... E03B 7/071 137/456 |
| 6,209,576 | B1 | * | 4/2001 | Davis ................... E03B 7/071 137/460 |
| 6,237,618 | B1 | * | 5/2001 | Kushner .............. E03B 7/071 137/1 |
| 6,708,722 | B1 | * | 3/2004 | Goodenough ........ E03B 7/071 137/460 |
| 6,763,974 | B1 | * | 7/2004 | Shermer ................ B67D 7/36 137/458 |
| 6,945,274 | B1 | | 9/2005 | Davis |
| 7,114,516 | B2 | * | 10/2006 | Ito ....................... F16K 15/066 137/487.5 |
| 7,204,270 | B2 | * | 4/2007 | Hendrix .................. E03D 1/00 137/486 |
| 7,574,896 | B1 | | 8/2009 | Cooper |
| 7,849,890 | B2 | | 12/2010 | Jones |
| 7,900,647 | B2 | * | 3/2011 | Tornay ................... F17D 5/06 137/15.11 |
| 7,900,650 | B1 | * | 3/2011 | Wilson ................... F17D 5/00 137/551 |
| 2010/0212748 | A1 | * | 8/2010 | Davidoff ................. F17D 5/02 137/10 |

\* cited by examiner

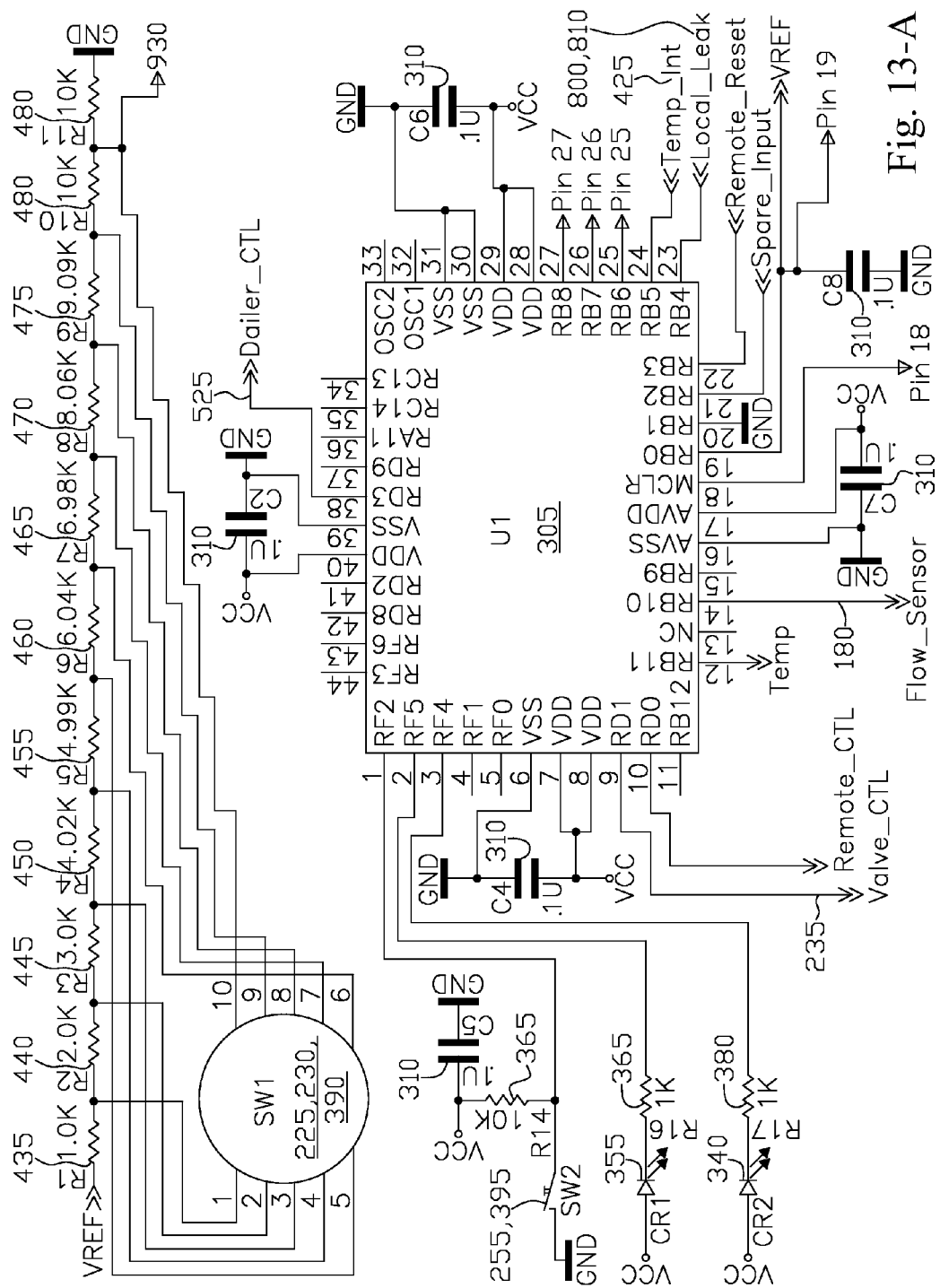
Fig. 13-A

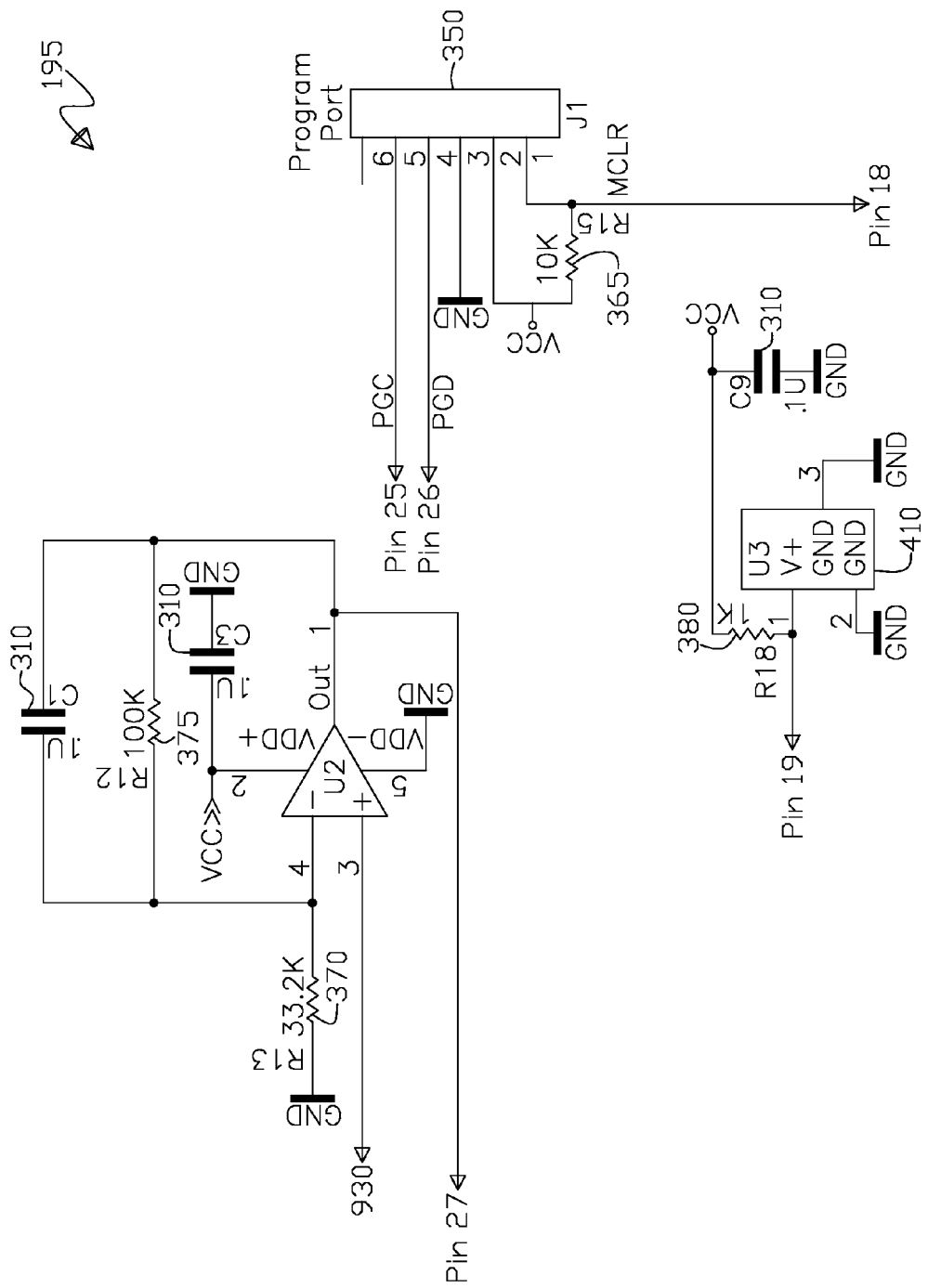
Fig. 13-B

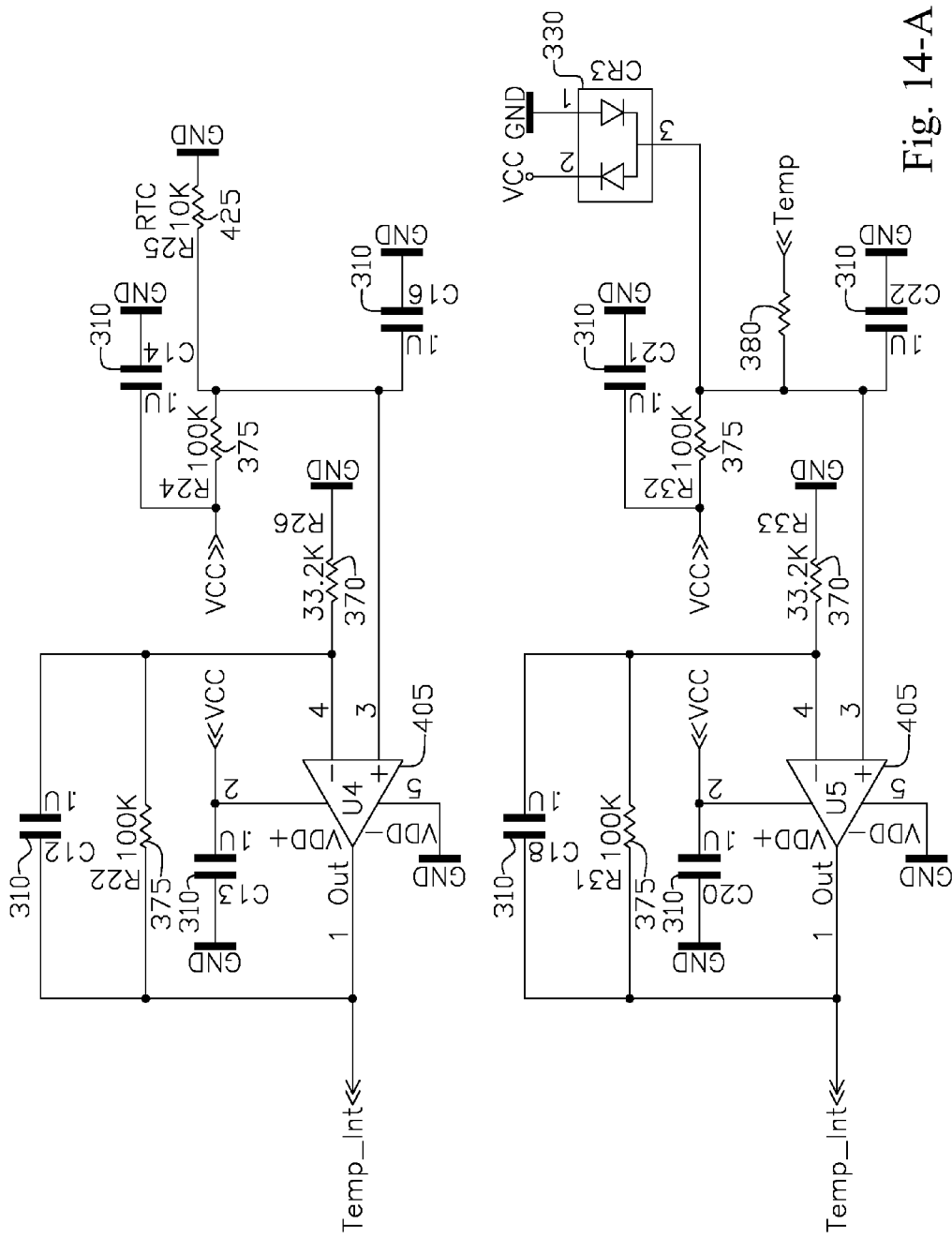
Fig. 14-A

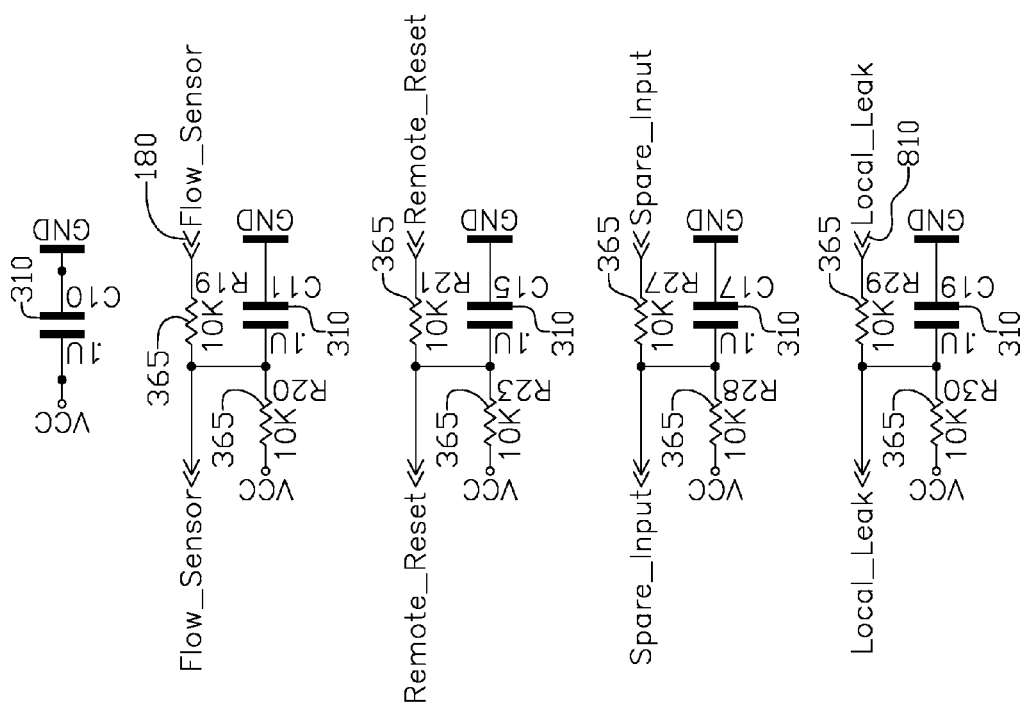
Fig. 14-B

FLUID LEAK DETECTION AND SHUTDOWN APPARATUS

RELATED APPLICATIONS

This is a continuation in part (CIP) patent application of U.S. patent application Ser. No. 14/224,059 filed on Mar. 24, 2014 by Kevin Duane Guy of Yuma, Colo., US., that is a continuation in part (CIP) patent application of U.S. patent application Ser. No. 13/272,219 filed on Oct. 13, 2011 by Kevin Duane Guy of Yuma, Colo., US.

TECHNICAL FIELD

The present invention relates generally to a fluid leak detection and shutdown apparatus. More specifically, the present invention relates to an electro-mechanical based liquid leak detection and shutdown apparatus for detecting the presence of a selected amount of liquid flow in a particular location in a liquid line, for the purpose of initiating a sequence of actions that is intended to shutdown the upstream liquid flow of liquid to prevent further damage to an environment that would be susceptible to damage from the unintended liquid flow.

BACKGROUND OF INVENTION

Typically the ideal location for first detecting a leak is adjacent to the source of the leak for the purpose of not only stopping the leaks as soon as possible to minimize damage, but to pinpoint the actual source of the leak, however, usually the leak source is in an difficult to access location or area, thus placement of an automated leak detection apparatus in its ideal location will hasten the timeliness of a useful perceptible output from the leak detection apparatus to minimize damage to either or both the machine that may be malfunctioning via leaking or surrounding structure affected by the leak. However, as a practical matter, having an automated leak detention apparatus everywhere a leak may occur is not realistic due to the multitude of potential leak locations causing undue complication and cost.

Wherein normally without the presence of any type of leak detection apparatus, a small liquid leakage from a machine, say for instance hidden underneath a large heavy ice making machine (that is rarely moved) that has a low volumetric flow rate leak or in other words a seeping leak can cause significant damage to the machine and/or surrounding adjacent structure prior to being detected. Unfortunately, the ice machine will continue to work perfectly during its small leakage phase thus not alerting a user to the presence of the slight leakage condition, at least until the surrounding structure suffers significant damage, wherein the leak would more likely be detected.

Thus, this situation can continue for quite some time until extensive damage has occurred in the hidden machine portions and/or support structure, wherein at some later in time point the structural damage eventually becomes obvious, wherein the structural damage from the liquid seepage is more excessive than it should be. Thus, the result is that the support structure suffers additional damage that is hidden from view in addition to the leaked fluid, typically water or even worse a fluid that is toxic or chemical in nature that could risk further safety, electrical risk, or environmental harm. Unfortunately, water damage can most likely occur one the office or home is vacant wherein a frozen pipe can be burst shutoff valves can fail to say toilet tanks or for instance refrigerator ice makers can have line ruptures in addition to dishwashers, and items such as broken hoses to washing machines. The typical damage would include damage to wallboard, wallpaper, paint, electrical fixtures and wiring, carpeting and padding, vinyl flooring, subflooring, or building structure, plus furniture and other household items. In addition, items such as financial records, photos, and other irreplaceable items can be destroyed beyond retrieval or repair. Further, later forming issues can include hazardous molds and the like that will require even more costly and difficult cleanups.

Thus, the key issues for the leak detection apparatus involve, small space or size requirements for the apparatus, as the specific placement location for the apparatus may be in a confined area with difficult accessibility, a further issue in the leak detection apparatus is the sensitivity of generating a perceptible output from a very low liquid leakage flow rate, usually in the range of about one-third (⅓) of a gallon per minute to detect a leak prior to a significant damage occurring, i.e. catching the leak as soon as possible. Another issue for the leak detection apparatus is to ideally have a single leak detection apparatus able to cover a multitude of potential leak points for ease of installation and to reduce cost, and in addition for the leak detection apparatus to automatically shutdown the root source of the leakage based upon the detection of leakage to minimize damage either to machines, equipment, or the surrounding structure or environment from leakage damage.

Looking at the prior art in this area, in U.S. Pat. No. 7,900,650 to Wilson disclosed is a system that provides for the remote control shutoff of the main water supply to a structure in an unattended manner. The Wilson system comprises a solenoid activated shutoff valve typically mounted immediately downstream of a main water shutoff valve and a locking enclosure containing a remote control switch and audible alarm unit. A manual bypass valve in Wilson is provided as an override should it be required. Also in Wilson, because the system requires electricity to operate, a general power failure will automatically shut off of the water supply. Further, activation of the Wilson system is accomplished using a remote control to control the system from a distance. Note that there is no teaching of a flow meter in a bypass line disclosed in Wilson in conjunction with the solenoid activated shutoff valve, a bypass line is taught, however, only with a manual valve. Wilson does not also teach the automated shutting off of the water supply in the event of a leak occurring when there is no one around the house or water system, as Wilson requires the manual selectively shutting off of the water system, suggesting that the water system be completely shut off when the homeowner is absent, however, in this case the homeowner could just manually shut off their main water valve without the Wilson system. Also when a homeowner is absent, Wilson ignores the fact that a hot water heater needs a continuous feed of water even without use, unless Wilson advocates shutting down the hot water heater also, which was not disclosed.

Continuing in the prior art, in U.S. Pat. No. 6,945,274 to Davis being similar to Wilson, wherein Davis discloses a modular water supply shut off and by manual valve pass system that can be installed in a standard water supply line and used to prevent water flow through the supply line except when the system is activated. The system in Davis includes a modular unit having main fluid flow line provided with a remotely actuated valve and the manual bypass fluid flow line provided with a manually operated valve for cases of when the remotely actuated valve fails. The system in Davis also has a control unit that includes a timing mechanism that be operated to actuate the remotely actuated valve and allow water to flow through the main fluid flow line for a manually selected period of time determined by the timing mechanism. A momentary switch in Davis is coupled to the control unit and used to actuate the timing mechanism. Thus, Davis is design to facilitate the water main valve to be "on" or open for the selected amount of time and then to automatically close the main valve when the selected time has elapsed, say for instance in a vacation home, also included is a reset momentary switch which can re-start the timer. Davis does not teach any form of leak detection or water system automatic shut off in the event of a water system leak, as there is no measure of flow rate with a flow meter.

Further, in the prior art looking at U.S. Pat. No. 7,574,896 to Cooper disclosed is a leak detection apparatus for detecting and controlling a leak in a pressurized piping system, which comprises: control logic; both of one and only one flow detector in communication with said logic, and one and only one pressure detector in communication with said logic; and a control valve in communication with said logic; wherein at least one of the following additional features is also provided: the control logic, both of one and only one flow detector and one and only one pressure detector, and the control valve are in close proximity to one another; and the control valve has a baseline condition of being shut off. In Cooper, the pressure detector works via detecting pressure degradation and/or flow rate increase, however, pressure detection to monitor low leakage situations would be problematic, as with slow leaks, pressure drop may not even occur as the municipal water supply will maintain a constant feed pressure of water into the system unless the flow rate is excessively high causing a water system pressure drop, the only instance wherein system pressure drops would detect small leakage is when the system does not have a pressure water or liquid feed, such as a closed off system, however, the teaching is for a municipal constant water pressure feed system, see column 6, lines 10-15, thus water pressure sensing would only detect relatively high flow rates. In operation in Cooper, the flow detector is used for sensing user demand, in which case there is user demand, then the main valve remains open until user demand ceases, at which time flow rate detection and pressure drop detection would activate closing of the main valve, although teaching of how user demand is really sensed is not present—however, it would typically involve some form of electronic sensor at each water use appliance, which would be complicated and costly, Cooper does mention using the timer for a time window in which user demand is assumed thus negating when flow or pressure sensing would activate closing the main valve, however, this could facilitate a leak being allowed to proceed (i.e. no main valve shut off) if the user demand time window is longer. Note that the flow detector in Cooper must be sized and configured to handle the full flow rate of the system, which would limit the low flow rate detection limit, especially in larger flow rate systems, as the flow detector is not in a bypass loop—but is in the mail flow loop.

Next, in the prior art, in looking at U.S. Pat. No. 5,415,033 to Maresca, Jr., et al. disclosed is a apparatus for detection of leaks in pressurized pipelines which utilizes a large pressure vessel and a small measurement vessel. The measurement vessel in Maresca, Jr. magnifies level changes during leak detection tests due to volume change amplification from the small measurement vessel, wherein the apparatus is connected to a pipeline through the measurement vessel. The entire system in Maresca Jr. can be filled with liquid from the pipeline by opening a valve between the measurement and pressure vessels. Leak detection tests in Maresca Jr. are conducted by measuring changes in volume with the measurement vessel over time while the pressure over the liquid in the pressure vessel and measurement vessel is maintained approximately constant and during tests, liquid communication between the measurement vessel and pressure vessel is prevented by closing the valve between them, but vapor communication between the vessels is permitted, thus measurement by volume is done not by pressure—wherein the pressure is maintained at a constant level by large pressure vessel to eliminate pressure effects on the volume measurement due to the typical hydrocarbon having high sensitivity to environmental conditions that cause variance in vapor pressure of the liquid in the system being measured for leakage. Note that there is no need for a flow meter in Maresca Jr., which would be considered undesirable due to the low leakage flow rates required to be detected being around 0.1 gallon per hour.

Further, in the prior art in U.S. Pat. No. 7,849,890 to Jones disclosed is an assembly, comprising: a sealed housing; at least one moisture-sensitive component disposed of within the sealed housing. Jones is designed for electronic equipment that is disposed within the sealed housing for protection from the elements, wherein it is desired to detect a buildup of moisture within the housing. The housing in Jones has a first sensor element operable to generate a first signal in response to moisture in a first state being present at a first predetermined level within the sealed housing; also a first valve element coupled to the housing and, in response to the first signal, operable to enable at least a portion of the moisture to exit the housing at the first valve element. Further in Jones, a second sensor element is operable to generate a second signal in response to moisture in a second state being present at a second predetermined level within the sealed housing; a third sensor element operable to sense that a pressure outside the housing is less than a pressure within the housing; and a second valve element coupled to the housing. In response to the second signal in Jones, it is operable to enable at least a portion of the moisture to exit the sealed housing at the second valve element if and only if the pressure level inside the sealed housing is greater than a pressure level outside the sealed housing. Note that in Jones there is no flow meter, as Jones basically utilizes a float switch (moisture-sensitive component) and valve that senses a certain level of an amount of static moisture accumulation in the housing-sends a signal from the switch and the valve facilitates the moisture level buildup to exit the housing.

There remains a need for a fluid leak detection and shutdown apparatus that is simple to install, is self contained in not needing remotely mounted sensors, utilizes a flow switch bypass loop-allowing for a smaller (lower flow rate) and more accurate flow sensor for lower flow rates that is less expensive, and a time delay to main valve actuation to the closed position thus accommodating normal system low flow but temporary flow items such as refrigerator ice makers, evaporative coolers, hot water heater refills, and the like, such as to not cause unnecessary shut-offs of the main valve actuation. A single fluid leak detection and shutdown apparatus should be able to detect any leak within a system from a central inlet location within the system and after the proper conditions have been satisfied automatically shut down the main valve actuation to the system to stop the leakage and thereby the subsequent damage to the equipment and environment.

SUMMARY OF INVENTION

Broadly, the present invention is of a fluid leak detection and shutdown apparatus for a fluid distribution system having a total fluid distribution system flow rate, the fluid distribution system having an inlet and an outlet. The fluid leak detection and shutdown apparatus including a solenoid shutoff valve having a longitudinal axis, the solenoid shutoff valve having a flow capacity substantially matched to the total fluid distribution system flow rate, and the solenoid shutoff valve is adapted to be in fluid communication downstream from the fluid distribution system inlet. The solenoid shutoff valve having an open operational state that allows fluid flow therethrough and a closed operational state that substantially precludes fluid flow therethrough, also the solenoid shutoff valve having a default position of being in the open operational state and the solenoid shutoff valve having an activated position of being in the closed operational state.

Also included in the fluid leak detection and shutdown apparatus is a primary fluid flow line having a lengthwise axis, the primary fluid flow line is in downstream fluid communication with the solenoid shutoff valve, the primary fluid flow line also being in upstream fluid communication with the fluid distribution system outlet. The primary fluid flow line having a primary fluid flow line cross sectional flow area associated with a primary fluid flow rate, with the lengthwise axis being coincident to the longitudinal axis.

Further included in the fluid leak detection and shutdown apparatus is a check valve in fluid communication with the primary fluid flow line, wherein the check valve allows fluid flow from the solenoid shutoff valve to the fluid distribution system outlet. The check valve substantially preventing fluid flow from the fluid distribution system outlet to the solenoid shutoff valve, the check valve including an opening spring with a spring rate that is sufficient to create a calibrated crack open force.

Also included in the fluid leak detection and shutdown apparatus is a secondary fluid flow line having a long axis, the secondary fluid flow line is in downstream fluid communication with the solenoid shutoff valve, the secondary fluid flow line also being in upstream fluid communication with the fluid distribution system outlet. The secondary fluid flow line having a secondary fluid flow line cross sectional flow area associated with a secondary fluid flow rate, wherein the secondary fluid flow line cross sectional flow area is less than the primary fluid flow line cross sectional flow area such that the secondary fluid flow rate is less than the primary fluid flow rate, the secondary fluid flow line long axis being perpendicular to the longitudinal axis and the coincident lengthwise axis. The check valve required crack open force initially diverts a portion of the total fluid distribution system flow rate to the secondary fluid flow line resulting in the secondary fluid flow rate.

Yet, further included in the fluid leak detection and shutdown apparatus is a flow sensor in fluid communication with the secondary fluid flow line, the flow sensor having a perceptible output, wherein the flow sensor has a flow sensing flow rate capacity that is less than the solenoid shutoff flow capacity. Wherein, operationally the flow sensor receives a portion of the solenoid shutoff valve flow capacity in priority over the primary fluid flow line due to the required check valve crack open force, the primary fluid flow line receiving a remaining portion of the solenoid shutoff valve flow capacity, thus allowing the flow sensor to detect minimal flow rates from the secondary fluid flow rate. Plus also included in the fluid leak detection and shutdown apparatus is a means for activating the solenoid shutoff valve based on the flow sensor perceptible output.

These and other objects of the present invention will become more readily appreciated and understood from a consideration of the following detailed description of the exemplary embodiments of the present invention when taken together with the accompanying drawings, in which;

BRIEF DESCRIPTION OF DRAWINGS

FIG. 1 shows an initial electrical power supply and electrical power supply communication link that is connected to a 10 position terminal block, further shown is the modem module assembly with its attendant electrical power supply and electrical power supply communication link, a connection to a phone system, and the modem activation signal line from the 10 position terminal block;

FIG. 9 continues the detailed diagrammatic flow chart of the controller logic flow, starting with FIG. 8 continuation element that continues to FIG. 9 with the next step of checking for flow sensor error and then a further step of confirming that the spare input is on and then checking in a subsequent step on checking for error in the spare input, further a next step is on checking for a local leak and a next step of checking for a local leak indication error with the diagram logic flow terminating in a matching element that starts on FIG. 10;

FIG. 10 continues the detailed diagrammatic flow chart of the controller logic flow, starting with FIG. 9 continuation element that continues to FIG. 10 with the next step of whether a local leak was detected and then a step of checking for an error in the local leak detector and if so a next step of activating the error on red LED, and after this a next step of reading the timer switch setting for time delay to set the error timeout with the diagram logic flow terminating in a matching element that starts on FIG. 11;

FIG. 11 continues the detailed diagrammatic flow chart of the controller logic flow, starting with FIG. 10 continuation element that continues to FIG. 11 with the next step of comparing the error time to being greater than the error timeout and if so activating the red LED error light, if not then a step of checking for temperature reading error, if so then activating the red LED error light if not returning to the loop through matching elements in FIGS. 10, 9, and 8 to restart the loop process;

FIGS. 13-A and 13-B combined show the detailed schematic for the means for controlling to activate/deactivate the solenoid valve based primarily on the flow sensor output via the flow sensor communication link, starting with the centrally located controller chip that is connected to the 10 position switch used for selectable manual time delay settings of differing time periods, wherein the switch is connected to a series of ascending ohm value resistors that eventually connect to the controller chip, further shown in FIGS. 13-A and 13-B are the reset switch and reset circuitry, the red LED error on light, the green LED system operation on light, the solenoid motor control valve connection, along with the remote indicator, the auxiliary temperature, and flow sensor output to the controller chip, also the local temperature input is shown, as well as the local leak connection being shown, the remote reset is shown, and the spare input, in addition, the program port is shown, and the power supply connection to pins 28 and 29;

FIGS. 14-A and 14-B combined show the control system inputs for the fluid leak detection and shutdown apparatus that include the circuitry for the temperature sensor in the form of the thermistor that feeds controller chip pin 24 via the temperature circuitry shown in FIG. 14, further the external temperature circuitry is shown that is connected to pin 12 on the controller chip, also the flow sensor circuitry is shown that is in-between the flow sensor communication link and pin 14 on the controller chip, plus the remote reset circuitry is shown that connects to pin 22 on the controller chip, further the spare input circuitry is shown that connects to pin 21 on the controller chip, and finally the local leak circuitry is shown that connects to pin 23 on the controller chip;

REFERENCE NUMBERS IN DRAWINGS

Figure 1:
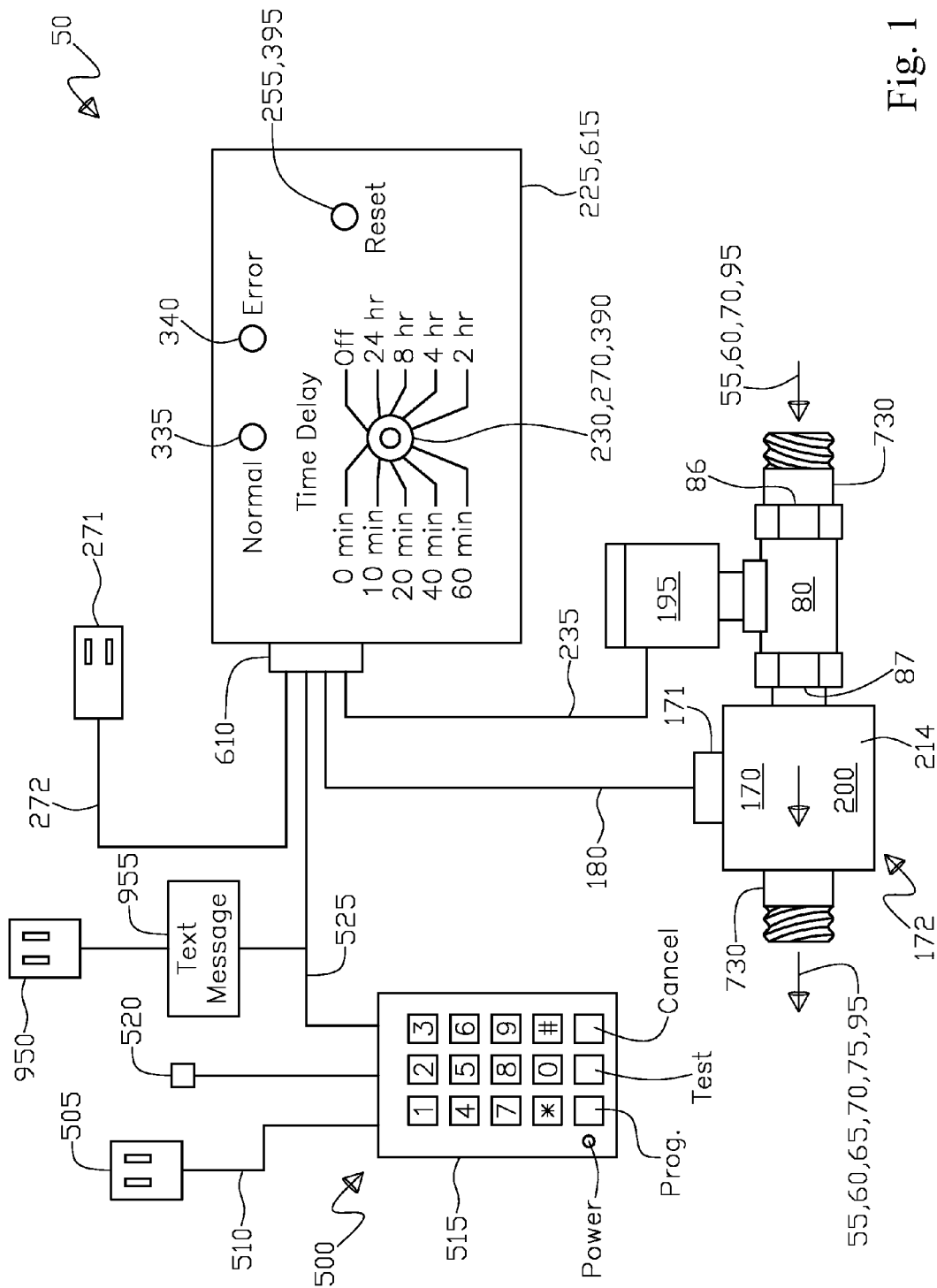
FIG. 1 show a side elevation view of the fluid leak detection and shutdown apparatus that includes nipple connections for flow in and flow out, wherein the nipple connections are connected to the fluid distribution system for the total fluid distribution system flow rate, the inlet of the apparatus, the outlet of the apparatus, the fluid flow direction, the article of the fluid distribution system that consumes a portion of the total fluid distribution system flow rate, a remote indicator panel, that includes a time delay selector switch, a normal green indicator light, an error red indicator light, and a reset switch, further

50 Fluid leak detection and shutdown apparatus
55 Fluid distribution system
60 Total fluid distribution system flow rate
65 Inlet of fluid distribution system 55
70 Outlet of fluid distribution system 55
75 Article of the fluid distribution system that consumes a portion of the total fluid distribution system 55 flow rate 60
80 Solenoid shutdown valve being preferably a Tee Jet part number 344BEC-24-C that is a 12 Volt, 2 way valve with a 0.6 second shut off having a polypropylene 1 inch ball
85 Longitudinal axis of solenoid shutdown valve 80
86 Valve inlet of valve 80
87 Valve outlet of valve 80
90 Solenoid shutdown valve 80 adapted to be in fluid communication downstream from the inlet 65 of the fluid distribution system 55
95 Fluid flow
96 Leakage flow rate
100 Primary fluid flow line
105 Lengthwise axis of the primary fluid flow line 100
110 Primary fluid flow line 100 in downstream fluid communication with the solenoid shutoff valve 80
115 Primary fluid flow line 100 in upstream fluid communication with the fluid distribution system 55 outlet 70
120 Cross sectional fluid flow area of the primary fluid flow line 100
121 Internal diameter of the primary fluid flow line 100
125 Primary fluid flow rate
130 Substantially perpendicular relationship as between the long axis 140 and the lengthwise axis 105 and the coincident longitudinal axis 85
135 Secondary fluid flow line
136 Outlet flow sensor 170
137 Inlet flow sensor 170
140 Long axis of the secondary fluid flow line 135
145 Secondary fluid flow line 135 in downstream fluid communication with the solenoid shutoff valve 80
150 Secondary fluid flow line 135 in upstream fluid communication with the fluid distribution system 55 outlet 70
155 Cross sectional fluid flow area of the secondary fluid flow line 135
160 Secondary fluid flow rate
170 Flow sensor
171 Switch for flow sensor 170, preferably being a Hamlin magnetic reed switch model# HA15-2-22-28
172 Integrated flow sensor that includes flow sensor 170, switch 171, and check valve 200
173 Open state of switch 171
174 Closed state of switch 171
175 Flow sensor in fluid communication with the secondary fluid flow line 135
176 Magnet for switch 171, the magnet 176 is preferably a NdFeB-Epoxy Coated N-48
177 Open state of magnet 176
178 Closed state of magnet 176
179 Spring for magnet 176 being preferably constructed of stainless steel at ¼ inch in size
180 Perceptible output of the flow sensor 170
181 Outlet bore for axial slidable engagement of magnet 176
182 Inlet bore for magnet 176
183 Shoulder disposed in-between the inlet bore 182 and the outlet bore 181
184 First threshold secondary fluid flow line 135 low flow rate
185 Flow sensor 170 receiving a portion of the solenoid shutoff valve 80 flow capacity in priority over the primary fluid flow line 100
186 Second threshold primary fluid flow line 100 high flow rate
187 Clearance as between the magnet 176 and the magnet outlet bore 181 as positioned perpendicular to the long axis 140
188 Affixed interface of the magnetic flow switch 176
190 Primary fluid flow line receiving the remaining portion of the solenoid shutoff valve
80 flow capacity
195 Means for controlling to activate/deactivate the solenoid shutoff valve 80 based primarily on the flow sensor 170 perceptible output 180.
200 Check valve being preferably a 1 inch size constructed of brass that is modified with a special spring 201 that increases the cracking open pressure of the check valve 200 to initiate flow, thus helping to divert the initial flow 60 to the flow sensor 170 for low flow leak detection by the means for controlling 195 to initiate further action, see FIGS. 10-14 for logic.
201 Special check valve 200 spring 201 that is preferably constructed of a stainless steel tapered compression spring
202 Housing outlet, flow switch portion 171 of check valve 200 being preferably constructed of Delrin 100 or 500
203 Housing inlet, spring 201 portion of check valve 200 preferably constructed of Delrin 100 or 500
204 Poppet of check valve 200 being preferably constructed of Brass that is Jinjuan model J95-02
205 Check valve 200 in fluid communication with the primary fluid flow line 100
206 Outlet bore of check valve 200
207 Rod of poppet 204
208 Axial guide of rod 207
209 Seat sealing for poppet 204
210 Check valve 200 allowing fluid flow from the solenoid shutoff valve 80 to the fluid distribution system 55 outlet 70 with the check valve 200 in the open state
211 Inlet bore of check valve 200
212 Inlet for housing 203
213 Outlet for housing 202
214 Housing that includes outlet housing 202 and inlet housing 203
215 Check valve 200 substantially preventing fluid flow from the fluid distribution system 55 outlet 70 to the solenoid shutoff valve 80 with the check valve 200 in the closed state
216 Outer periphery of poppet 204
220 Check valve 200 substantially preventing flow from the primary fluid flow line 100 to the secondary fluid flow line 135 adjacent to the outlet 70 to the flow sensor 170 inlet with the check valve 200 in the closed state
225 Selectable time delay device circuitry
230 Switch for the selectable time delay device 225 using switch 390
235 Electrical communication as between the means for controlling 195 and the solenoid shutoff valve 80.

Figure 10:
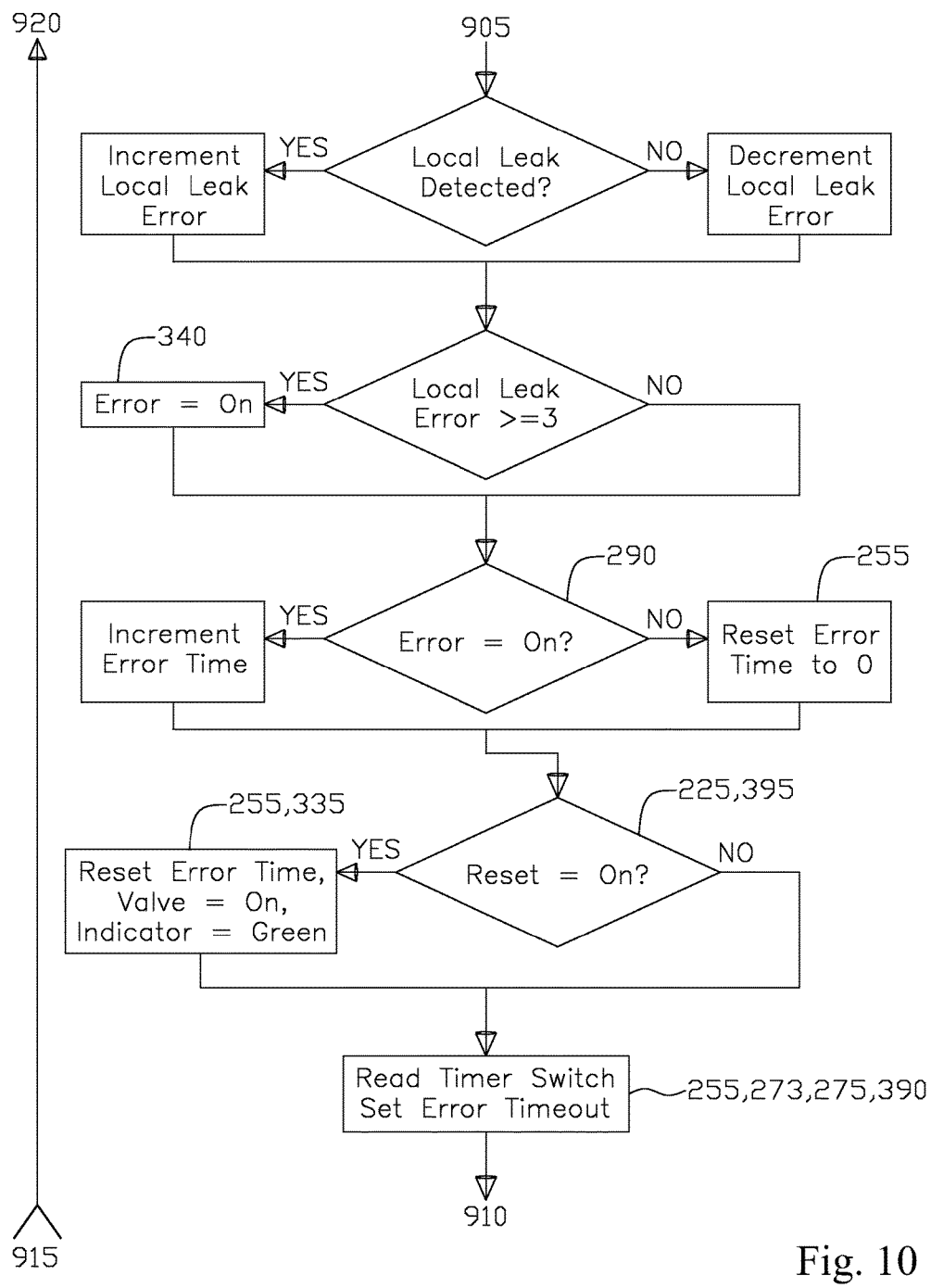
Figure 11:
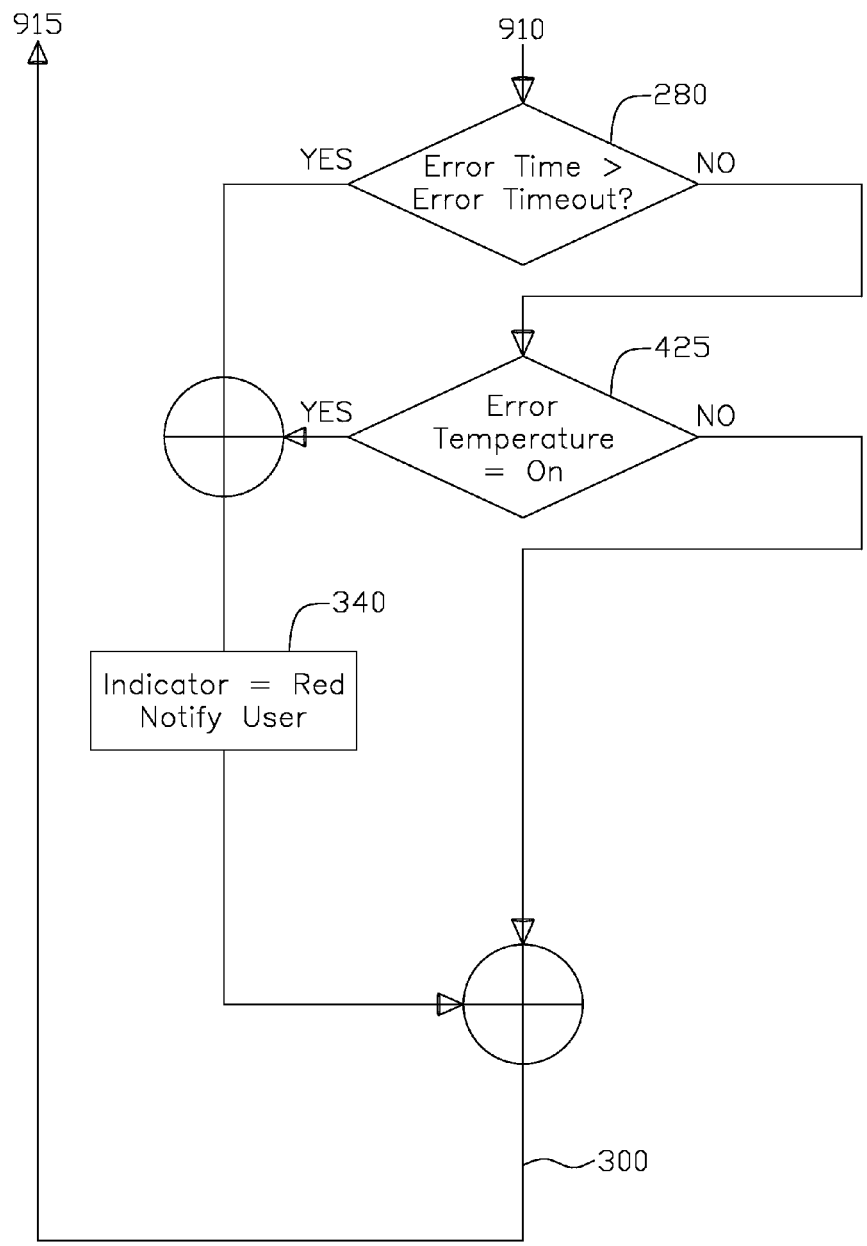
Figure 12:
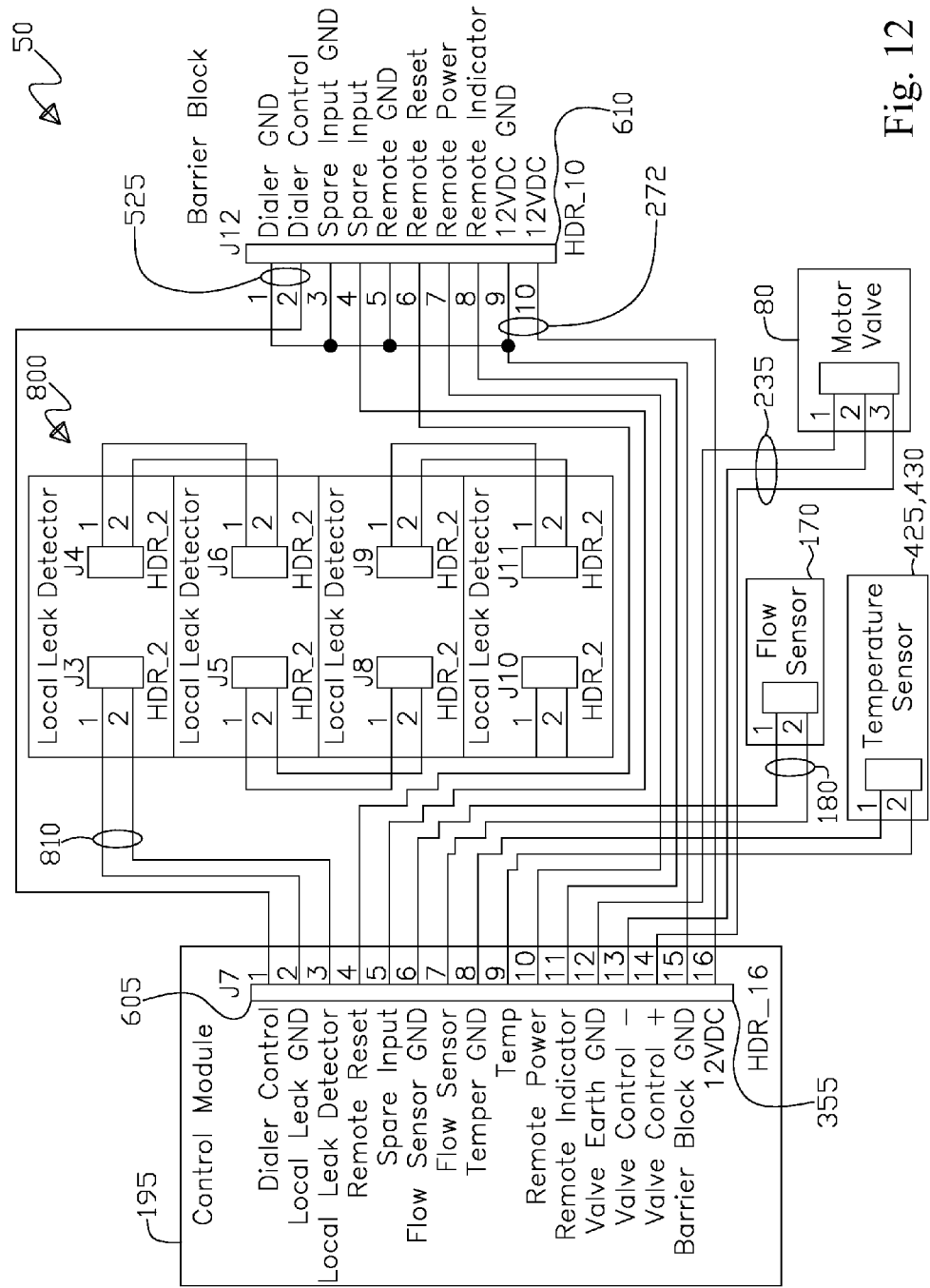
FIG. 12 shows a schematic assembly of the fluid leak detection and shutdown apparatus starting with the controller showing specifically the 16 position terminal block that is the interface of the controller to elements via interfacing with the 10 position terminal block, wherein the local leak detector and the local leak detector communication links (can be multiples of the local leak detectors), the flow sensor and the communication link of the flow sensor, the temperature sensor and the communication link of the sensor, and finally the solenoid motor control valve and the communications links of the solenoid motor control valve.
Figure 16:
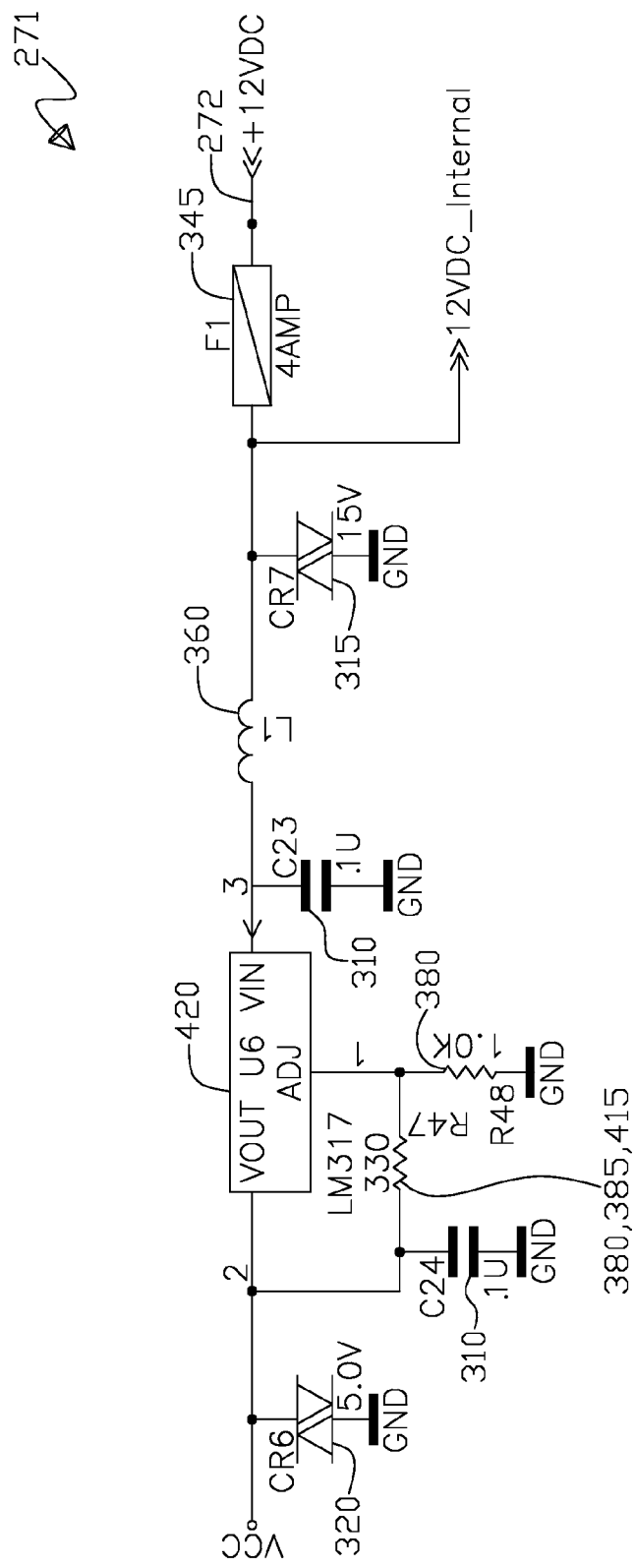
FIG. 16 shows the primary power supply circuitry for the fluid leak detection and shutdown apparatus that connects to pins 28 and 29 of the controller chip.

255 Selectable reset circuit using switch 395
270 Setting the time delay period on the selectable time delay device 225 using switch 390
271 Electrical power supply
272 Communication of electrical power supply 271
273 Setting time delay period of the time delay device 225 on the flow chart FIGS. 1, 8, 10, and 11.
275 Time delay device 225 start based upon flow sensor 170 perceptible output 180 occurring.
280 Is the time of the article 75 consumption of the total fluid flow rate 60 greater than the selected time delay period 270 or 273.
285 Activate solenoid shutoff valve 80 into the closed operational state
290 Pause time delay device 225 if article 75 consumption of total fluid flow rate 60 has suspended.
300 Re-start time delay device 225 if article 75 consumption of total fluid flow rate 60 has resumed.
305 Controller chip circuitry that is preferably a Microchip part number dsPIC30F4013-301/ML having a foot print configuration of QFN-44_8×8 mm
310 Capacitor preferably Yageo part number CC0805KRX7R9BB104 shape C0805 at 0.1 micro farad
315 Transient voltage suppressors preferably Littelfuse part number SMAJ15A shape SMA, 15Vr, 400 W, 16.4 A, 5% unidirectional
320 Transient voltage suppressors preferably AVX part number SMAJ5.0A shape SMA, 5Vr, 400 W, unidirectional
325 Small outline transistor preferably part number LM4040C201DBZR shape SOT23.
330 Small outline transistor preferably Fairchild part number BAV99FSCT shape SOT23.
335 LED preferably Lite-On part number LTL-307G Green being a perceptible output for means for control 195 being operational.
340 LED preferably Lite-On part number LTL-307E Red being a perceptible output for means for control 195 having an error.
345 Fuse preferably Bel part number 0ZCD0250FF2C shape SMD2920.
350 Jack RJ-11 preferably a TE Connectivity part number 520258-3.
355 Terminal block 16 position preferably a Phoenix Contact part number 1827266.
360 Inductor preferably part number EXC-ML20A390U shape L0805.
365 Resistor 10K ohm, preferably Panasonic part number ERJ-6GEYJ103V shape R0805.
370 Resistor 33.2K ohm, preferably Susumu part number RG2012P-3322-B-T5 shape R0805.
375 Resistor 100K ohm, preferably Panasonic part number ERA-6AEB104V shape R0805.
380 Resistor 1K ohm, preferably Panasonic part number ERJ-6GEYJ102V shape R0805.
385 Resistor 332 ohm, preferably Yageo part number RC0805FR-07332RL shape R0805.
390 Switch preferably C & K Components part number R10015RS02Q.
395 Switch preferably E-Switch part number KS-01Q-01
400 Transistor-bipolar 100 mA, 45V, preferably Micro Commercial Components part number BC847C-TP shape SOT 23
405 Voltage regulator preferably part number TLV2731LDBVT shape SOT23-5.
410 Transistor 10 mA, preferably part number LM4040C201DBZR shape SOT 23.
415 High Frequency Relay, 140 MW, 12V, Preferably a TE Connectivity part number IM06DGR.
420 Voltage regulator 500 mA ADJ, 1.2-37V Positive, preferably an ON Semiconductor part number LM317MBSTT3G shape SOT223.
425 Thermistor 10K ohm preferably a Vishay/BC Components part number NTCS0805E3103JMT.
430 Thermistor 10 k ohm preferably an EPCOS part number B57703M0103G040.
435 Resistor 1.0K preferably a Yageo part number P1.0KDACT-ND shape R0805.
440 Resistor 2.0K preferably a Yageo part number P2.0KDACT-ND shape R0805.
445 Resistor 3.0K preferably a Yageo part number P3.0KDACT-ND shape R0805.
450 Resistor 0.02K preferably a Yageo part number P4.02KDACT-ND shape R0805.
455 Resistor 4.99K preferably a Yageo part number P4.99KDACT-ND shape R0805.
460 Resistor 0.04K preferably a Yageo part number P6.04KDACT-ND shape R0805.
465 Resistor 6.98K preferably a Yageo part number P6.98KDACT-ND shape R0805.
470 Resistor 8.06K preferably a Yageo part number P8.06KDACT-ND shape R0805.
475 Resistor 0.09K preferably a Yageo part number P9.09KDACT-ND shape R0805.
480 Resistor 10K preferably a Yageo part number P10.0KDACT-ND shape R0805.
485 Resistor 0.0 ohm, preferably Yageo part number RC0805JR-070RL shape R0805.
500 Modem assembly circuitry
505 Power supply for the modem 500
510 Communication link of power supply 505
515 Modem module being preferably a brand Home Sitter Alarm model number HS-700 that includes a programmable phone number keypad that can program multiple phone number to call when the modem module is activated.
520 Communications network connection
525 Communication link from controller 305 to modem 515 that facilitates a dialer control signal.
605 Terminal block 16 position being preferably a Phoenix Contact part number 1803565.
610 Barrier block 10 position being preferably a Molex part number 38720-3210.
615 Indicator panel
700 Tubing fitting being preferably a ¼ inch, Parker brand.
705 Tubing being preferably a ¼ inch copper part number 65177511 from MSC Industrial Supply.
710 Elbow fitting for tubing being preferably a ¼ inch, 90 degree, and in stainless steel.
715 Adapter for flow sensor 170 being preferably an 11/16 inch for a discharge of the flow sensor 170
720 Adapter for flow sensor 170 being preferably an 11/16 inch for an inlet of the flow sensor 170
730 External connector nipple being preferably a 1 inch diameter by 3.5 inches long schedule 80 constructed of PVC.
800 Local leak detector being preferably a PCB from Advanced Circuits.
810 Communication from the local leak detector 800 to controller 305.
900 FIG. 11 to FIG. 12 continuation
905 FIG. 12 to FIG. 13 continuation
910 FIG. 13 to FIG. 14 continuation
915 FIG. 14 to FIG. 13 continuation 920 FIG. 13 to FIG. 12 continuation
925 FIG. 12 to FIG. 11 continuation
930 FIG. 16-B to FIG. 16-A continuation
950 Power supply for text message interface
955 Text message interface

DETAILED DESCRIPTION

With initial reference to FIG. 1 shown is a side elevation view of the fluid leak detection and shutdown apparatus 50 that includes the nipple connections 730 for flow in 65 and flow out 70, wherein the nipple connections 730 are connected to the fluid distribution system 55 for the total fluid distribution system flow rate 60. Further FIG. 1 shows the inlet 65 of the apparatus 50, the outlet 70 of the apparatus 50, the fluid flow direction 95, the article 75 of the fluid distribution system 55 that consumes a portion 75 of the total fluid distribution system flow rate 60. Also, FIG. 1 shows a remote indicator panel 615, that includes a time delay selector switch 390, a normal green indicator light 335, an error red indicator light 340, and a reset switch 395. In addition, FIG. 1 shows an initial electrical power supply 271 and electrical power supply communication link 272 that is connected to a 10 position terminal block 610, further shown is the modem module 500 assembly 515 with its attendant electrical power supply 505 and electrical power supply communication link 510, a connection 520 to a phone system, and the modem activation signal line 525 from the 10 position terminal block 610.

Figure 2:
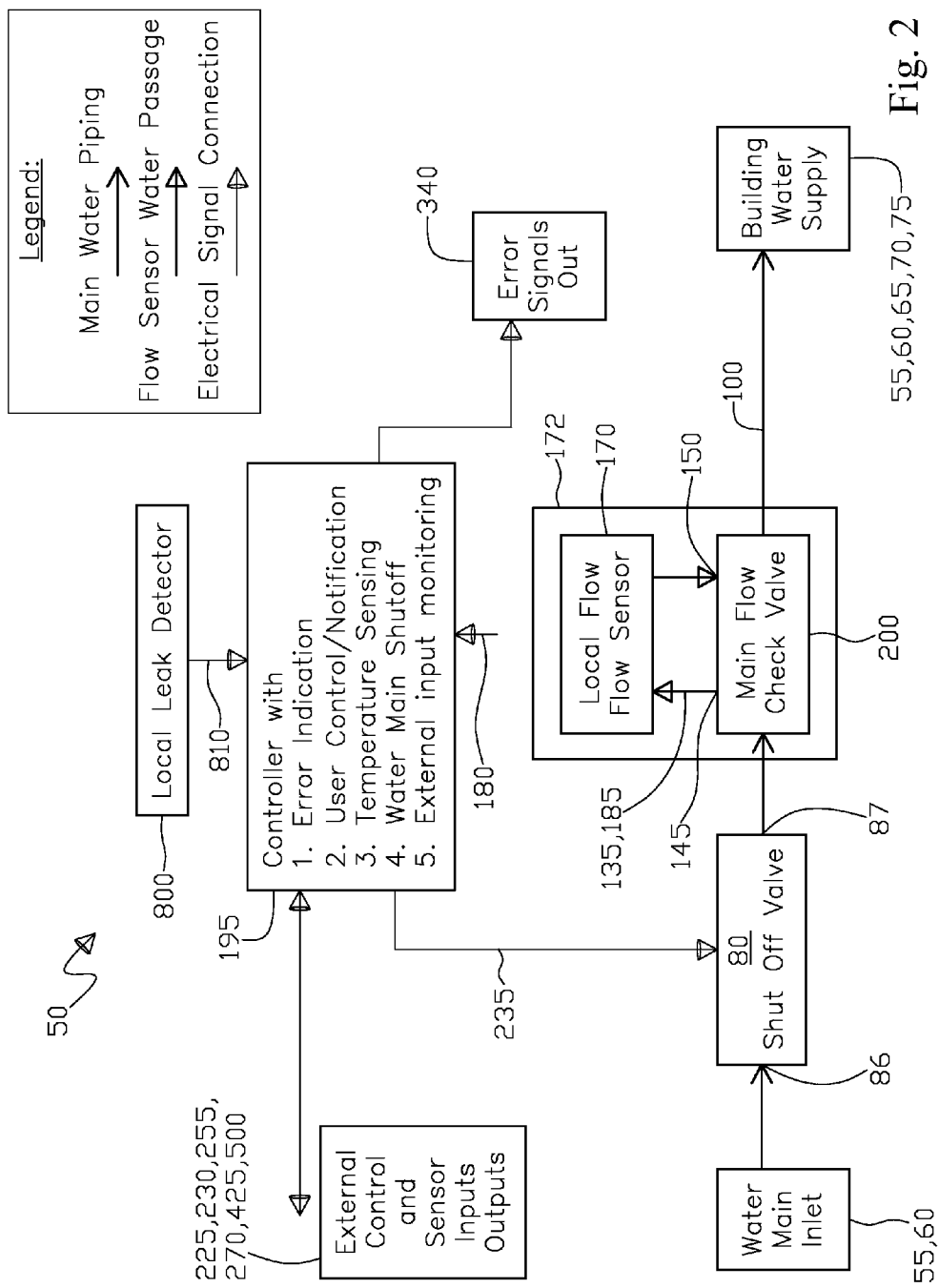
FIG. 2 shows a control system summary schematic for the fluid leak detection and shutdown apparatus showing the water main inlet for the fluid distribution system that has the total flow rate, the external control and sensor inputs and outputs that include the modem assembly, the temperature thermistors, the selectable reset circuit, the selectable switch for the time delay, further shown in FIG. 2 is the check valve in combination with the flow sensor, the solenoid shutdown valve, the means for controlling the solenoid shutdown valve that is in a normally open operational state and is activated into a closed state, an error signal out, and the outlet of the fluid leak detection and shutdown apparatus for the fluid distribution system total flow rate with the total flow going to the article that consumes a portion of the total fluid distribution system flow rate.

Continuing, FIG. 2 shows a control system 195 summary schematic for the fluid leak detection and shutdown apparatus 50. Next, FIG. 2 shows the water main inlet 65 for the fluid distribution system 55 that has the total flow rate 60, the external control and sensor inputs and outputs that include the modem assembly 500, the temperature thermistor 425, the selectable reset circuit 255, the selectable switch for the time delay 225, 230, 270. Further shown in FIG. 2 is the check valve 200, the flow sensor 170, the solenoid shutdown valve 80, the means 195 for controlling the solenoid shutdown valve 80 that is in a normally open operational state and is activated into a closed state. Additionally, shown in FIG. 2 is an error signal out 340, and the outlet 70 of the fluid leak detection and shutdown apparatus 50 for the fluid distribution system 55 total flow rate 60 with the total flow going to the article 75 that consumes a portion of the total fluid distribution system flow rate 60.

Figure 3:
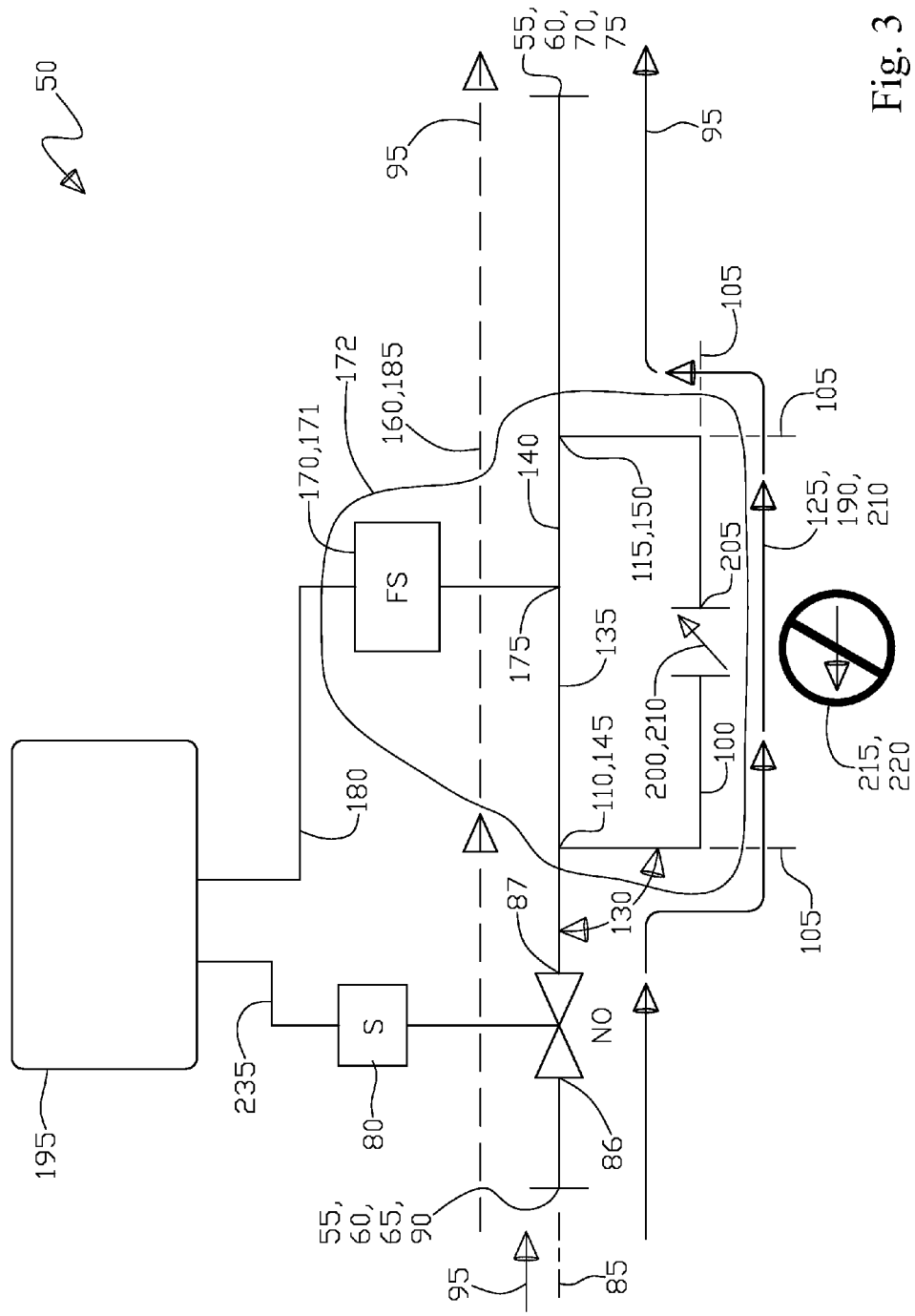
FIG. 3 shows a fluid flow schematic, an electrical communication schematic and a means for controlling solenoid valve schematic of the fluid leak detection and shutdown apparatus including the fluid distribution system, the solenoid shutdown valve, the primary fluid flow line, the secondary fluid flow line, the flow sensor, the means for activating/deactivating the solenoid shutoff valve and that further includes the check valve.

Next, FIG. 3 shows a fluid flow schematic, an electrical communication schematic and a means 195 for controlling the solenoid valve 80 schematic of the fluid leak detection and shutdown apparatus 50. Wherein FIG. 3 includes the fluid distribution system 55, the solenoid shutdown valve 80, the primary fluid flow line 100, the secondary fluid flow line 135, the flow sensor 170, the means 195 for activating/deactivating the solenoid shutoff valve 80 and that further includes the check valve 200.

Figure 4:
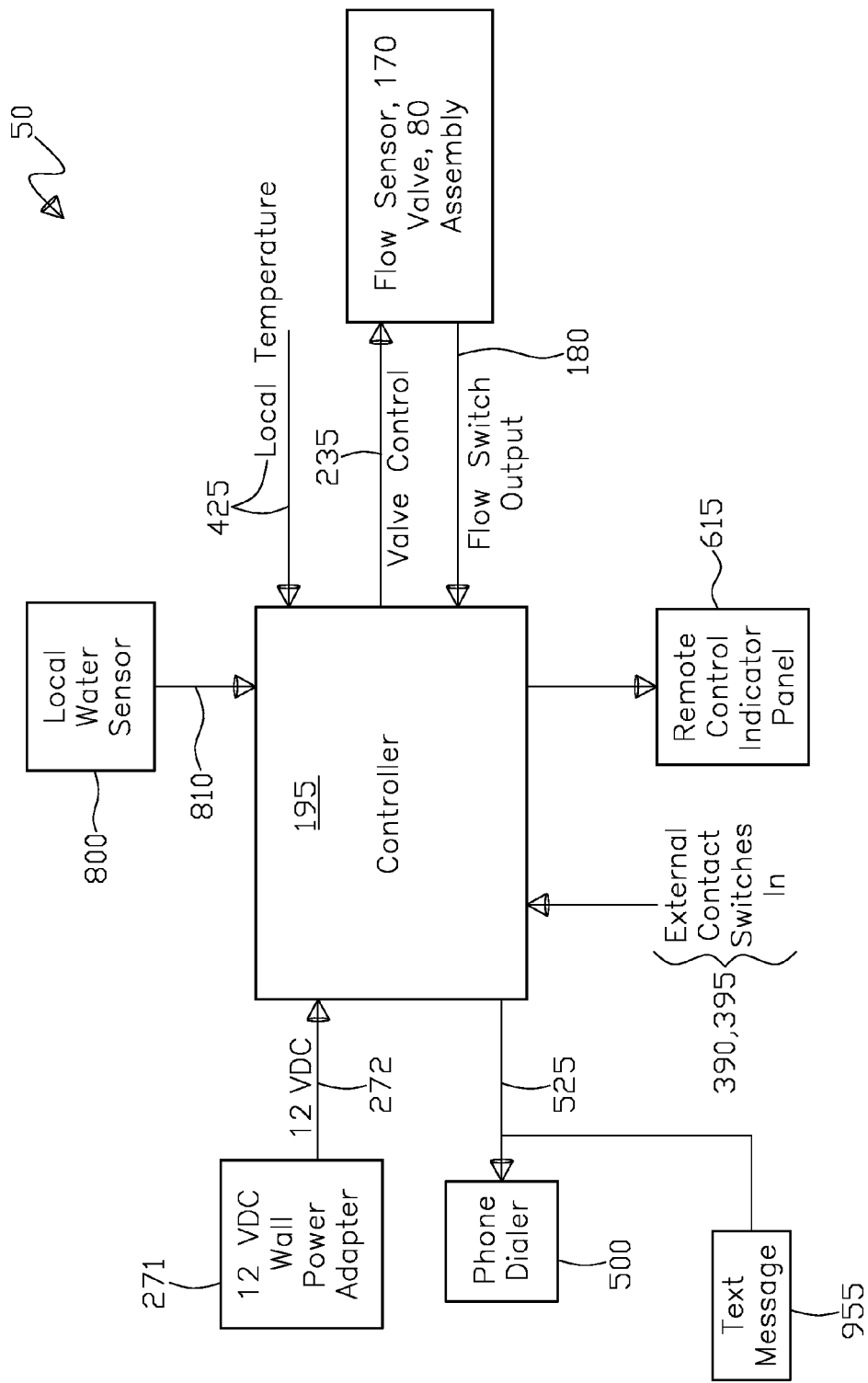
FIG. 4 shows a summary block diagram schematic of the fluid leak detection and shutdown apparatus that includes the means for controlling, the initial power supply for the means for controlling, the modem assembly, the external contact switches being the 10 position time delay selector switch and the reset switch, the internal or local water sensor, the local temperature input, the remote indicator panel, and the flow sensor and valve assembly and their respective communication links to the controller.

Further, FIG. 4 shows a summary block diagram schematic of the fluid leak detection and shutdown apparatus 50 that includes the means 195 for controlling, the initial power supply 271 for the means 195 for controlling, the modem assembly 500, the external contact switches being the 10 position time delay selector switch 390 and the reset switch 395. Also shown in FIG. 4 the local temperature input 425, the remote indicator panel 615, and the flow sensor 170 and valve assembly 80 and their respective communication links 180, 235 to the controller 195.

Figure 5:
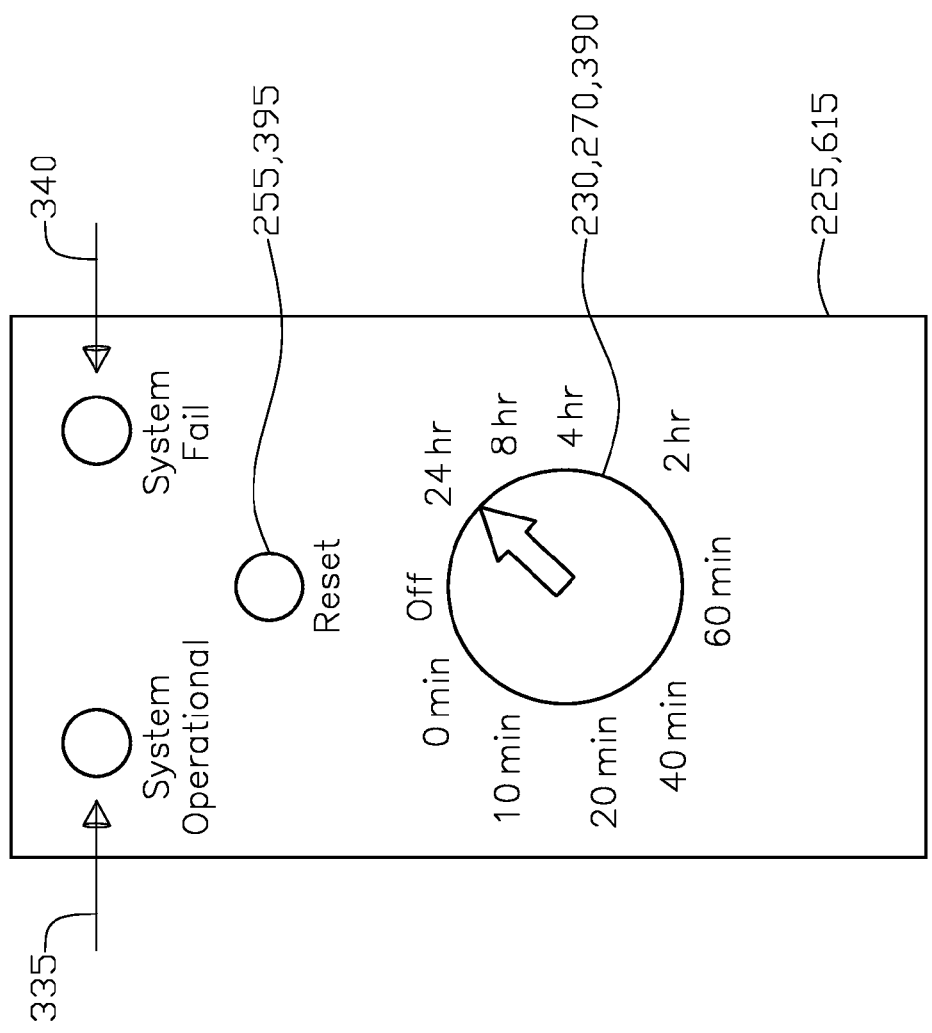
FIG. 5 shows a close-up of the remote indicator panel that includes the 10 position switch that allows for a selectable time delay setting to be done manually, in addition to the reset switch and circuit, plus the error red LED indicator and the green LED indicator for the fluid leak detection and shutdown apparatus being operational.
Figure 6:
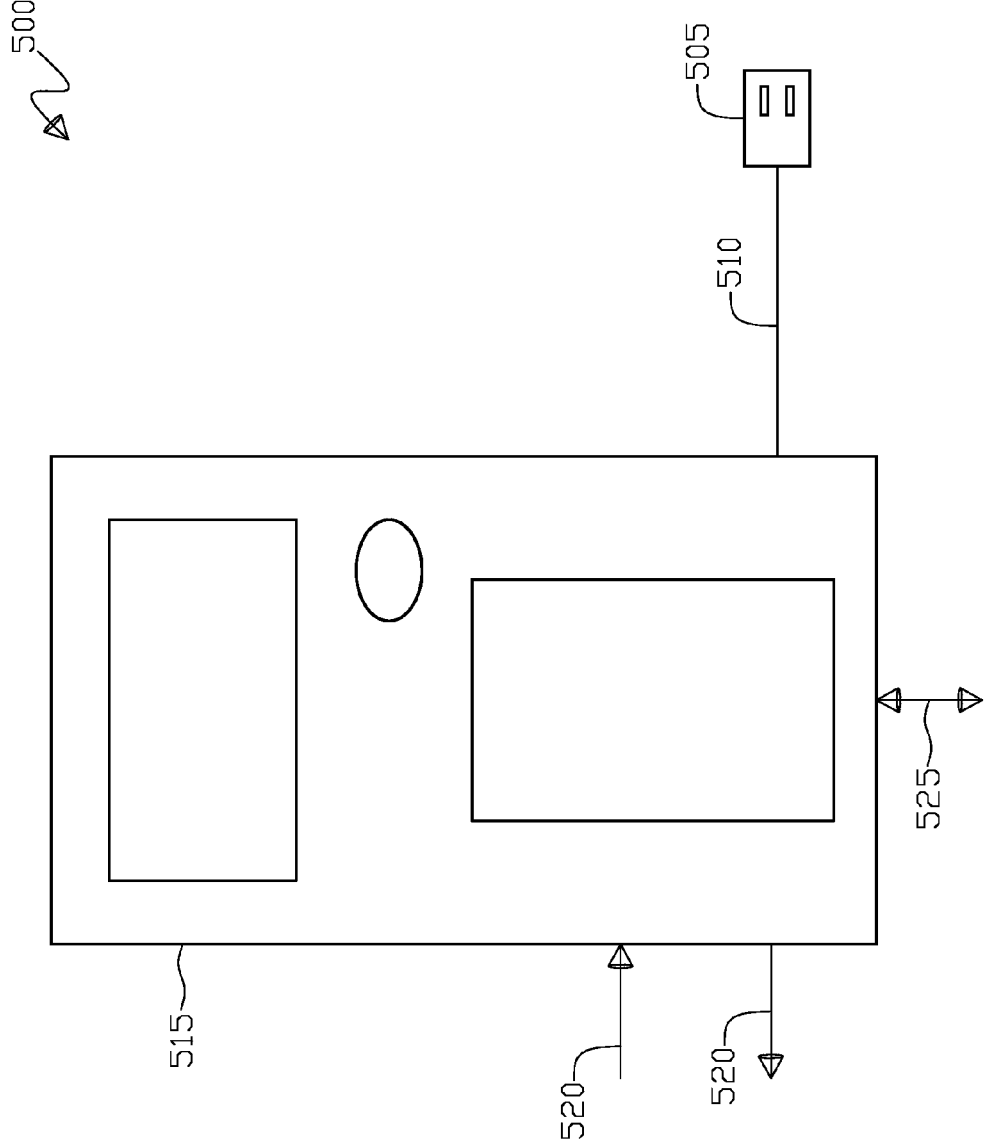
FIG. 6 shows a close-up view of the modem assembly which includes the modem power supply and its connection link, plus the RJ11 phone jack connection for communication with a phone system, and the communication link to the controller.
Figure 8:
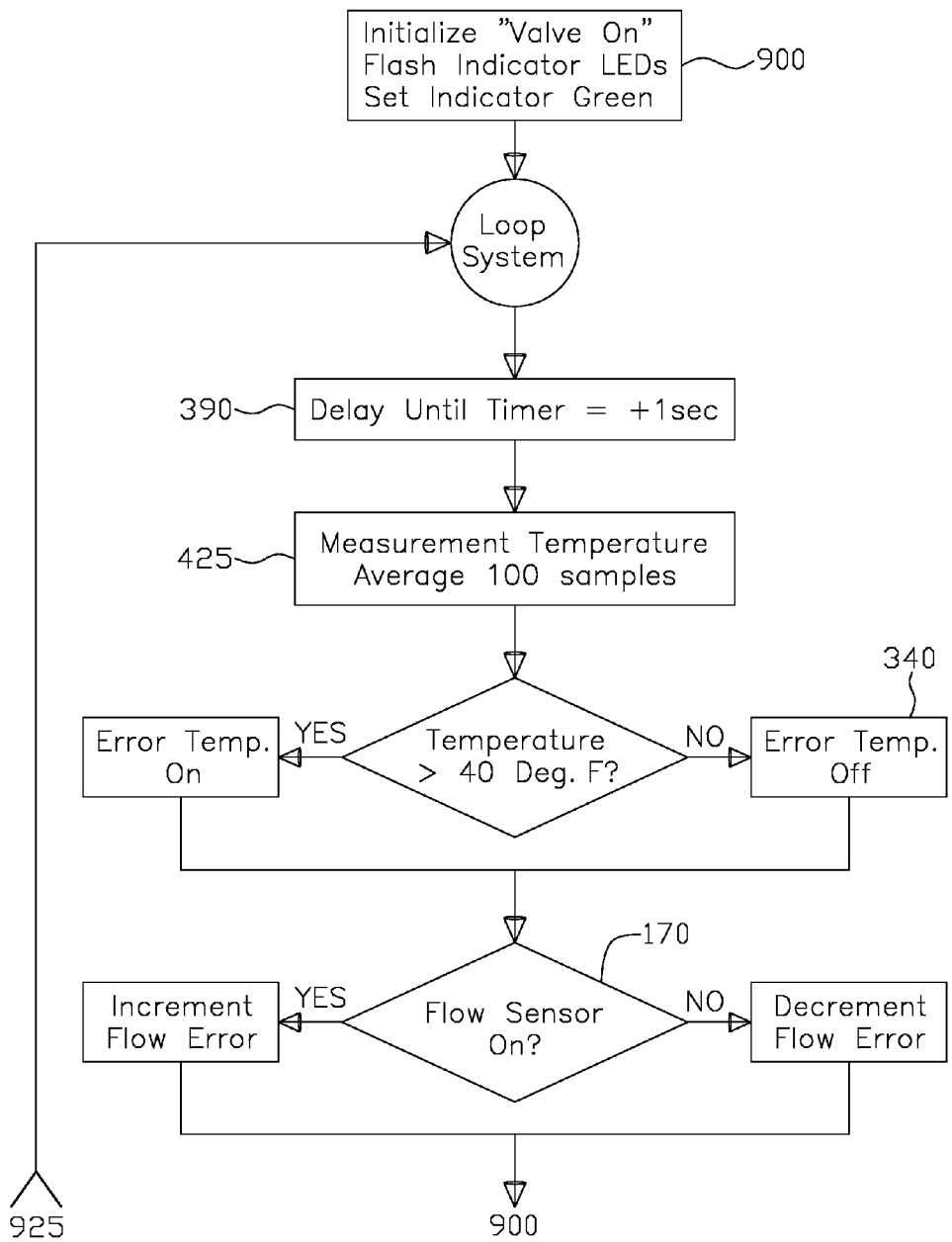
FIGS. 8 through 11 comprise a detailed diagrammatic flow chart of the controller logic flow, starting with FIG. 8 shown is an initial step of having a delay that is equal to the manually selectable time delay time period plus 1 second, and then a step of measuring the temperature to be safely above the freezing point for water, then a step of checking for flow sensor flow indication with the flow terminating in a matching element number that starts on FIG. 9.

Moving ahead, FIG. 5 shows a close-up of the remote indicator panel 615 that includes the 10 position switch 390 that allows for a selectable time delay setting 270 to be done manually 230. In addition, FIG. 8 shows the reset switch 395 and circuit 255, plus the error red LED indicator 340 and the green LED indicator 335 for the fluid leak detection and shutdown apparatus 50 being operational. Continuing, FIG. 6 shows a close-up view of the modem 500 assembly 515 which includes the modem power supply 505 and its connection link 510, plus the RJ11 phone jack connection 520 for communication with a phone system, and the communication link 525 to the controller 195.

Figure 7:
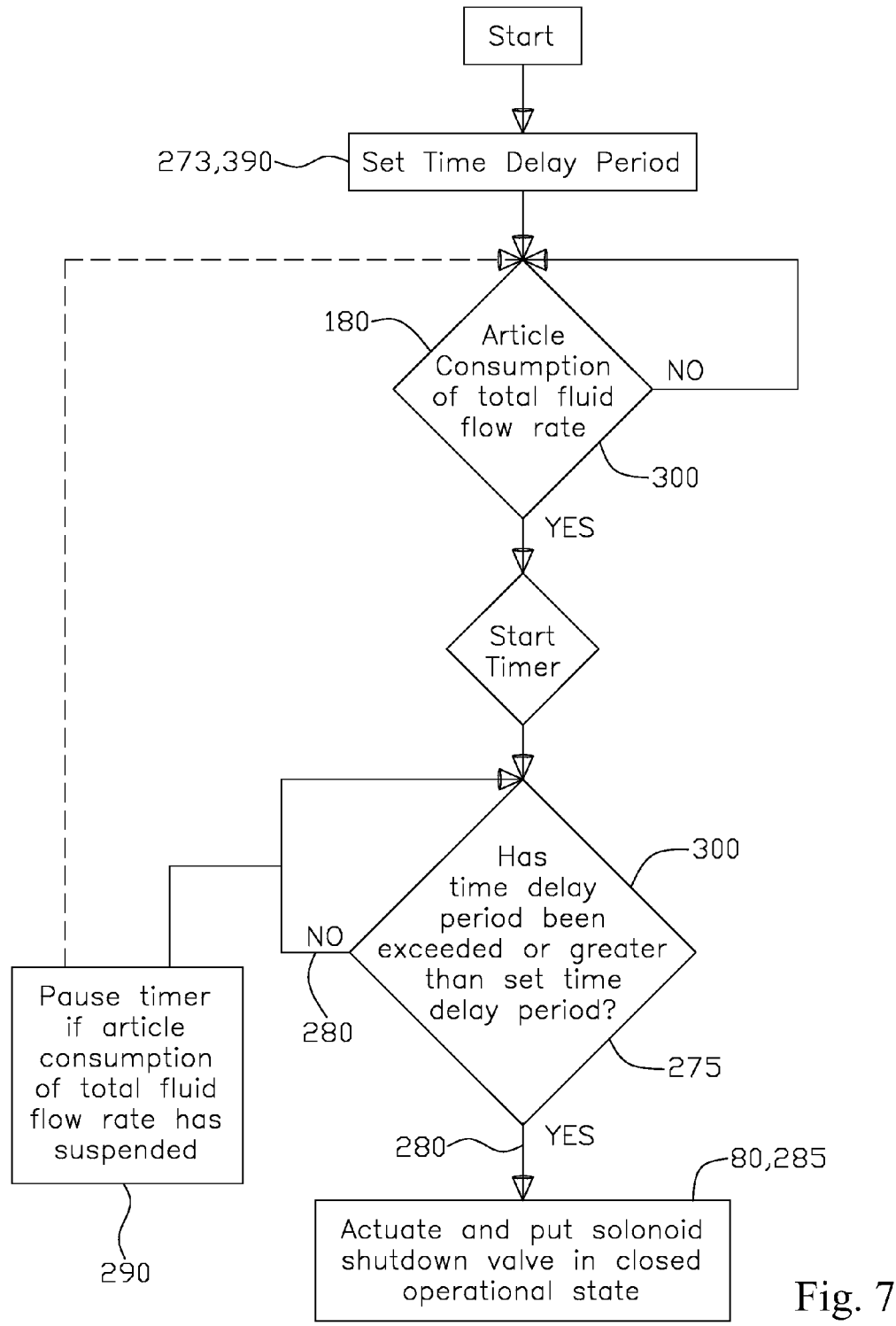
FIG. 7 shows a diagrammatic summary flow chart of the method of using the fluid leak detection and shutdown apparatus starting with the setting of the time delay period using the switch, measuring the article consumption of total fluid flow rate via the flow sensor, which starts the timer, wherein if the set time period has not been reached the solenoid shutoff valve is left in the open operational state or is paused if the flow sensor ceases to detect flow, until the set time delay period has elapsed at which time the solenoid shutoff valve is activated to place the solenoid shutoff valve in the closed operational state.

Further, FIG. 7 shows a diagrammatic summary flow chart of the method of using the fluid leak detection and shutdown apparatus 50 starting with the setting 273 of the time delay period using the switch 390, measuring the article 70 consumption of total fluid flow rate 60 via the flow sensor 170 (not shown), which starts the timer 275 or having a re-start 300 of the timer 273, 290, if the article 75 consumption of the total fluid flow rate 60 has suspended. In addition, FIG. 7 shows that if the set time period has not been reached the solenoid shutoff valve 80 (not shown) is left in the open operational state or is paused if the flow sensor 170 (not shown) ceases to detect flow, until the set time delay period has elapsed at which time the solenoid shutoff valve 80 (not shown) is activated to place the solenoid shutoff valve in the closed operational state.

Next, FIGS. 8 through 11 comprise a detailed diagrammatic flow chart of the controller 195 logic flow. Starting with FIG. 8 shown is an initial step of having the green LED indicator 335 on, a time delay that is equal to the manually selectable 390 time delay time period plus 1 second, and then a step of measuring the temperature 425 to be safely above the freezing point for water. Next shown on FIG. 8 a step of checking for flow sensor 170 (not shown) flow indication with the flow chart terminating in a matching element number 900 that goes from FIG. 8 to FIG. 9, note also that matching element number 925 is for the return loop flow chart flow in going from FIG. 9 to FIG. 8.

Figure 9:
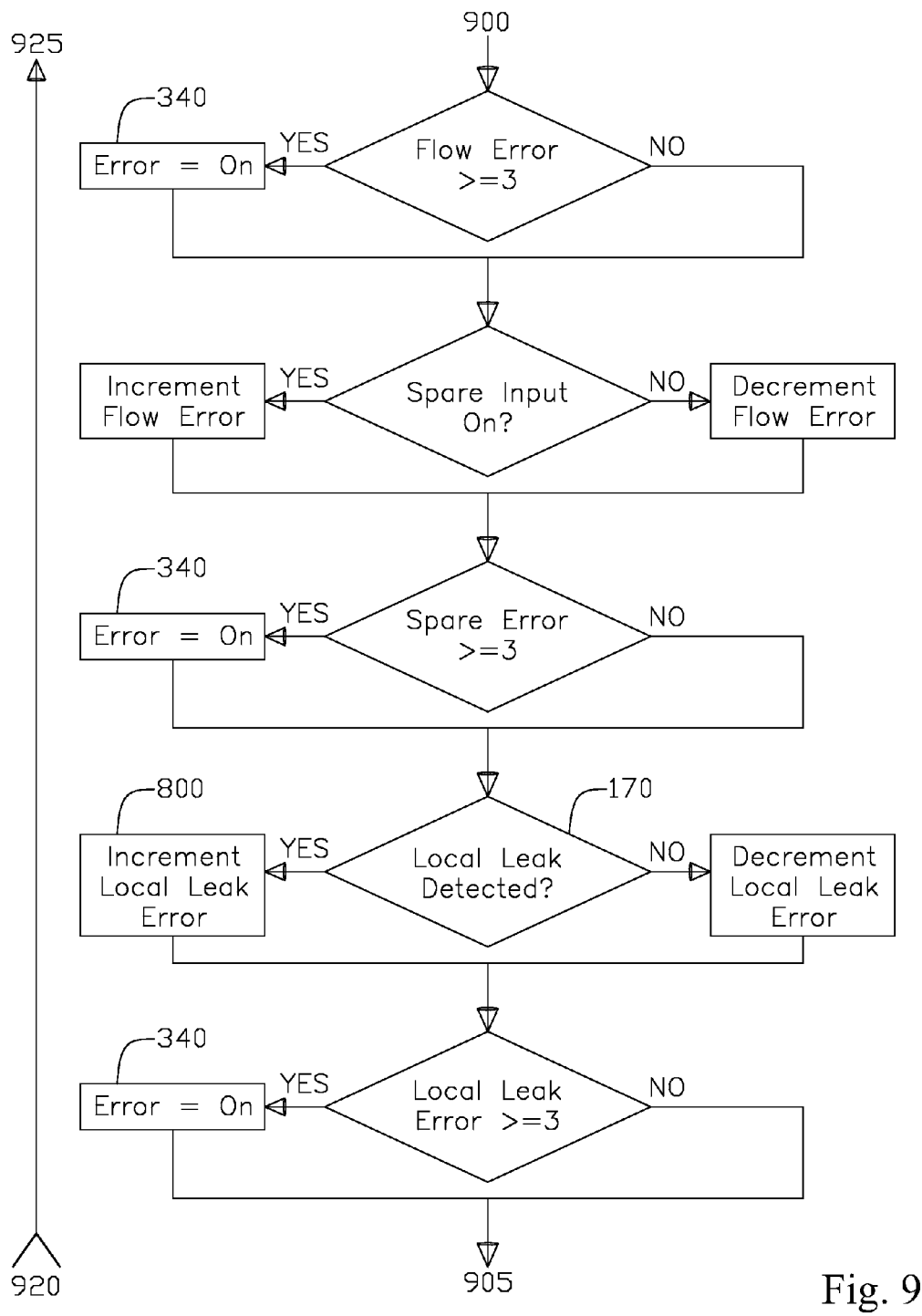

Continuing, FIG. 9 continues the detailed diagrammatic flow chart of the controller 195 logic flow, starting with FIG. 8 continuation element 900 that continues to FIG. 9 with the next step of checking for flow sensor 170 (not shown) error 340 and then a further step of confirming that the spare input is on and then checking in a subsequent step on checking for error 340 in the spare input, further a next step is on checking for a local leak 800 and a next step of checking for a local leak 800 indication error 340 with the diagram logic flow terminating in a matching element 905 that starts on FIG. 10, note also that matching element number 920 is for the return loop flow chart flow in going from FIG. 10 to FIG. 9.

Further, FIG. 10 continues the detailed diagrammatic flow chart of the controller 195 logic flow, starting with FIG. 9 continuation element 905 that continues to FIG. 10 with the next step of whether a local leak 800 was detected and then a step of checking for an error 340 in the local leak detector and if so a next step of activating the error on red LED 340, and after this a next step of reading the timer switch 390 setting 273 for time delay to set the error timeout or to pause 290 the time delay with automatic or manual switch 395 reset restart 255 of the selectable 225 time delay 273 with the green LED on 335 then diagram logic flow terminating in a matching element 910 that starts on FIG. 11, note also that matching element number 915 is for the return loop flow chart flow in going from FIG. 11 to FIG. 10.

Continuing, FIG. 11 continues the detailed diagrammatic flow chart of the controller 195 logic flow, starting with the FIG. 10 continuation element 910 that continues to FIG. 11 with the next step of comparing the error time 280 to being greater than the error timeout and if so activating the red LED error light 340, if not then a step of checking for temperature reading error 425, if so then activating the red LED error light 340 if not returning to the loop through matching element 915 in FIG. 11 to FIG. 10, then matching element 920 from FIG. 10 to FIG. 9, then matching element 925 from FIG. 9 to FIG. 8 all to restart the loop process.

Figure 15:
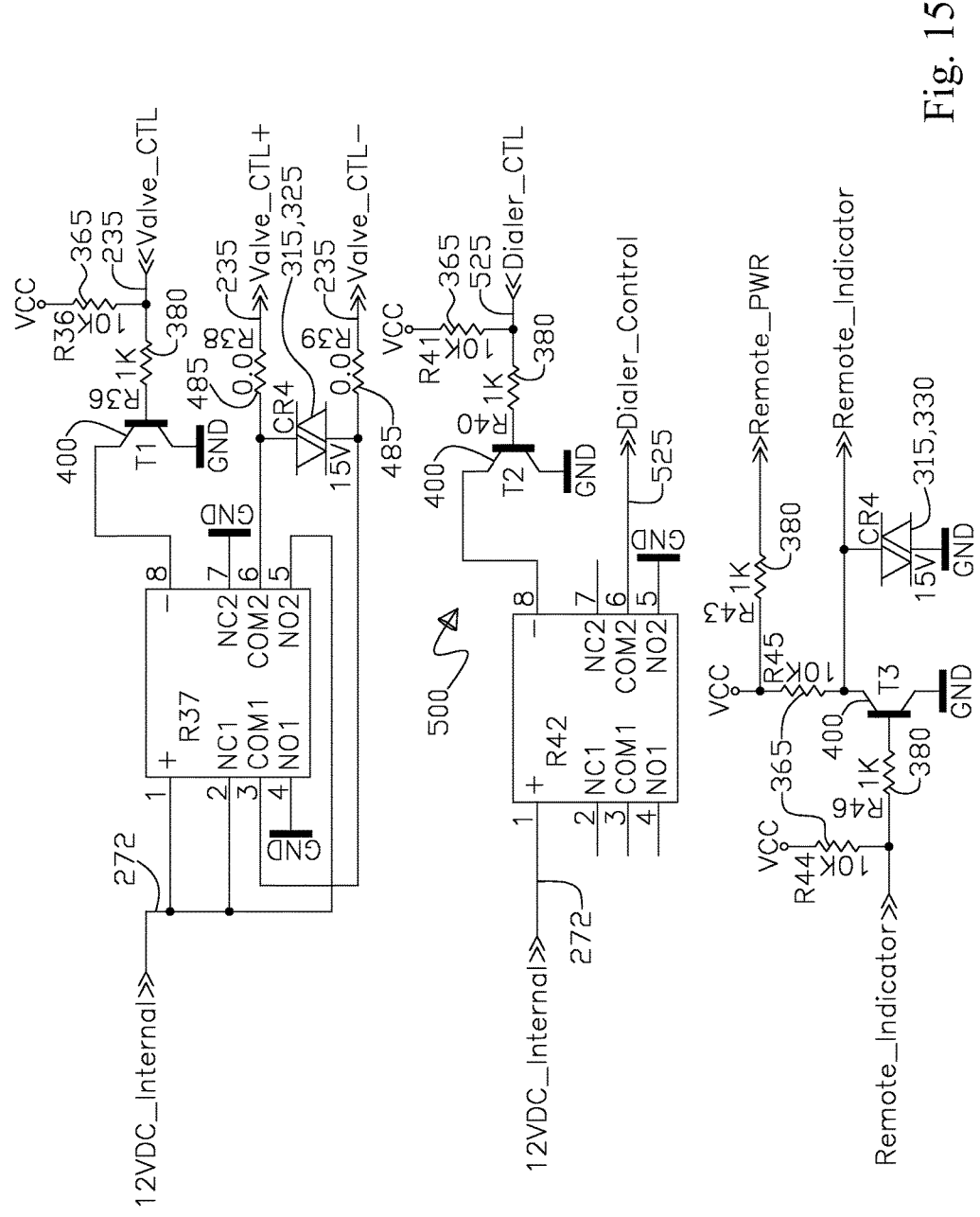
FIG. 15 shows the control system outputs for the fluid leak detection and shutdown apparatus that include the circuitry for the modem or dialer control line that connects to pin 38 on the controller chip, also shown in the circuitry for the solenoid valve control that originates at pin 9 of the controller chip complete with a power feed for the valve control circuitry for actuating the solenoid motor control valve, and finally the remote indicator circuitry that connects to pin 10 on the control chip.

Next, FIG. 12 shows a schematic assembly of the fluid leak detection and shutdown apparatus 50 starting with the controller 195 showing specifically the 16 position terminal plug 355 and mating block 605 that is the interface of the controller 195 to elements via interfacing with the 10 position terminal block 610. Also shown in FIG. 15 is the local leak detector 800 and the local leak detector communication links 810 (can be multiples of the local leak detectors 800). FIG. 12 further shows the flow sensor 170 and the communication link 180 of the flow sensor 170, the temperature sensors 425, 430 and the communication link of the sensor, and finally the solenoid motor control valve 80 and the communications links 235 of the solenoid motor control valve 80.

Moving ahead, FIGS. 13-A and 13-B show the detailed schematic for the means 195 for controlling to activate/deactivate the solenoid valve 80 based primarily on the flow sensor 170 (not shown) output 180 via the flow sensor communication link 180. In FIG. 13-A, starting with the centrally located controller chip 305 that is connected to the 10 position switch 390 used for selectable manual time delay settings 225, 230, 273 of differing time periods, wherein the switch 390 is connected to a series of ascending ohm value resistors 435, 440, 445, 450, 455, 460, 465, 470, 475, and 480 that eventually connect to the controller chip 305. The continuation connections from FIG. 13-B to FIG. 13-A are denoted by matching pin connection numbers and for continuation element number 930 that is between the switch 390 and the chip 305.

Further shown in FIGS. 13-A and 13-B are the reset switch 395 and reset circuitry 255, the red LED error on light 340, the green LED system operation on light 335, the solenoid motor control valve 80 connection 235. FIGS. 13-A and 13-B also shows the remote indicator, the auxiliary temperature, and flow sensor 170 (not shown) output 180 to the controller chip 305, also the local temperature input 425 is shown, as well as the local leak 800 connection 810 being shown, the remote reset is shown. In addition, in FIGS. 13-A and 13-B the spare input, plus the program port 350 is shown, and the power supply 271 (not shown) connection to controller chip 305 pins 28 and 29.

Continuing, FIGS. 14-A and 14-B show the control system inputs for the fluid leak detection and shutdown apparatus 50 that include the circuitry for the temperature sensor in the form of the thermistor 425 that feeds controller 305 chip pin 24 (as seen in FIG. 13-A) via the temperature circuitry shown in FIG. 14-A, further the external temperature circuitry is shown that is connected to pin 12 (as seen in FIG. 13-A) on the controller chip 305. Also FIG. 14-B shows the flow sensor 170 circuitry is shown that is in-between the flow sensor communication link 180 and pin 14 on the controller chip 305 (as seen in FIG. 13-A), plus the remote reset circuitry is shown that connects to pin 22 on the controller chip 305 (as seen in FIG. 13-A), further the spare input circuitry is shown that connects to pin 21 on the controller chip 305 (as seen in FIG. 13-A), and finally the local leak 810 circuitry is shown that connects to pin 23 on the controller chip 305 (as seen in FIG. 13-A).

Next, FIG. 15 shows the control system outputs for the fluid leak detection and shutdown apparatus 50 that include the circuitry for the modem 500 or dialer 515 control line 525 that connects to pin 38 on the controller chip 305 (as seen in FIG. 13-A). FIG. 15 also shows the circuitry for the solenoid valve 80 (not shown) control that originates at pin 9 of the controller chip 305 (as seen in FIG. 13-A) complete with a power feed 272 for the valve control circuitry for actuating through communication link 235 the solenoid motor control valve 80 (not shown), also including resistors 365, 380, and 485, transistors 400, 315, and 325. Also, FIG. 15 shows the remote indicator circuitry that connects to pin 10 on the control chip 305 (as seen in FIG. 13-A). Also shown is a remote indicator that includes resistors 365, 380, transistors 315, 330, 400, that can allow a remote perceptible output that originates at pin 10 on chip 305 on FIG. 13-A, wherein the remote perceptible output can be a light, buzzer, or suitable equivalent.

Following onward, FIG. 16 shows the primary power supply circuitry 271 for the fluid leak detection and shutdown apparatus 50 that connects to pins 28 and 29 of the controller chip 305 (as seen in FIGS. 13-A and 13-B), the primary power supply circuitry 271 includes a fuse 345, a transient voltage suppressors 315, 320, an inductor 360, capacitor 310, voltage regulator 420, and resistors 380, 385, 415, all as schematically arranged in FIG. 16. The primary power supply circuitry 271 takes power at 12 VDC from line 272 from the wall socket transformer as being the initial power supply 271, wherein the schematic in FIG. 16 delivers power to various points in FIGS. 13-A and 13-B denoted as VCC.

Figure 17:
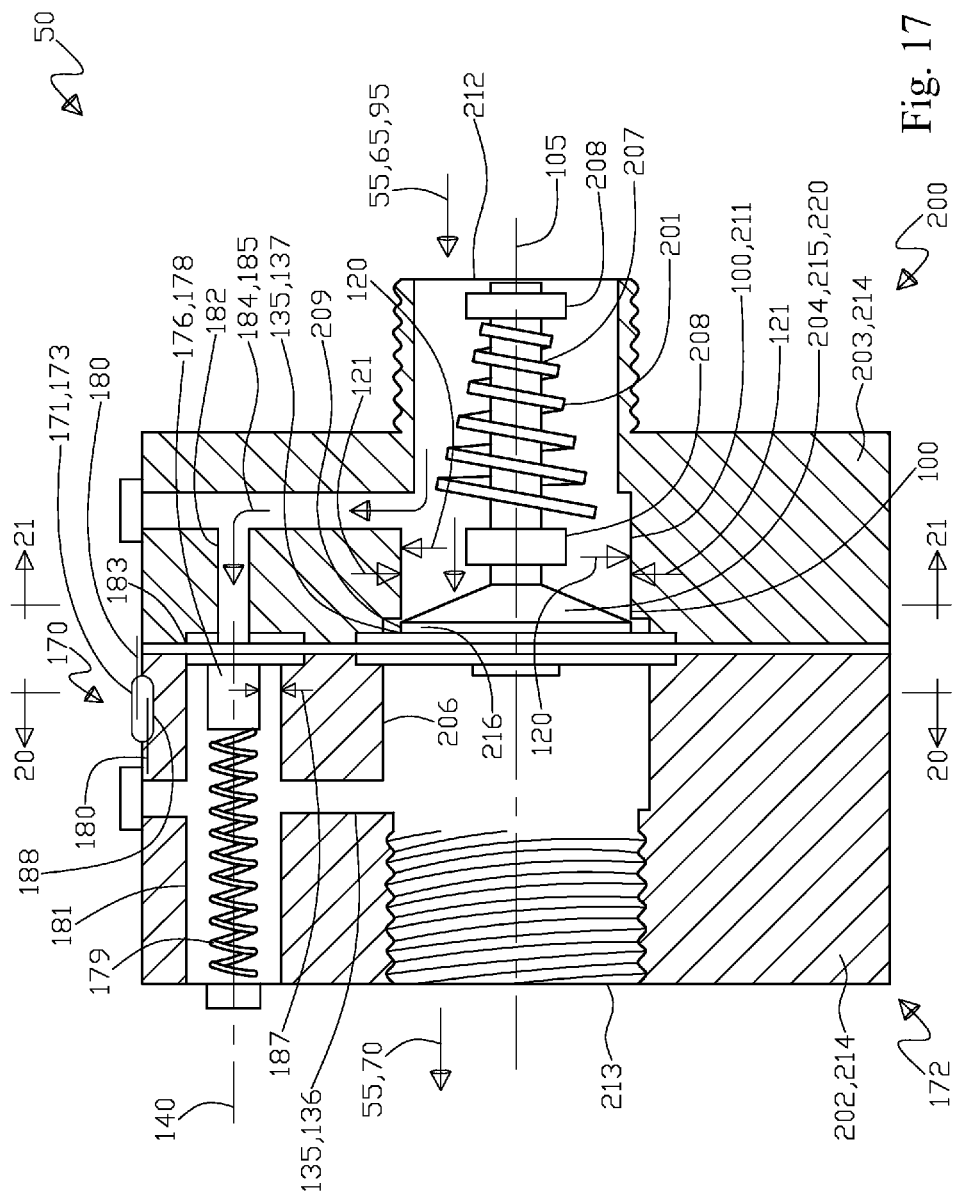
FIG. 17 shows a cross section view of the combination integrated flow sensor and check valve wherein the check valve is in the closed state with the flow sensor magnet in the closed state corresponding to the magnetic switch being in the open state, also shown are the magnet spring less compressed, the check valve spring less compressed, a rod, a poppet, and axial guides, the primary fluid flow line and the secondary fluid flow line all within a single housing.

Continuing, FIG. 17 shows a cross section view of the combination 172 integrated flow sensor 170 and check valve 200 wherein the check valve 200 is in the closed state 215 with the flow sensor 170 magnet 176 in the closed state 178 corresponding to the magnetic switch 171 being in the open state 173. Also shown in FIG. 17 are the magnet 176 spring 179 less compressed, the check valve 200 spring 201 less compressed, a rod 207, a poppet 204, and axial guides 208, the primary fluid flow line 100 and the secondary fluid flow line 135 all within a single housing 202, 203.

Figure 18:
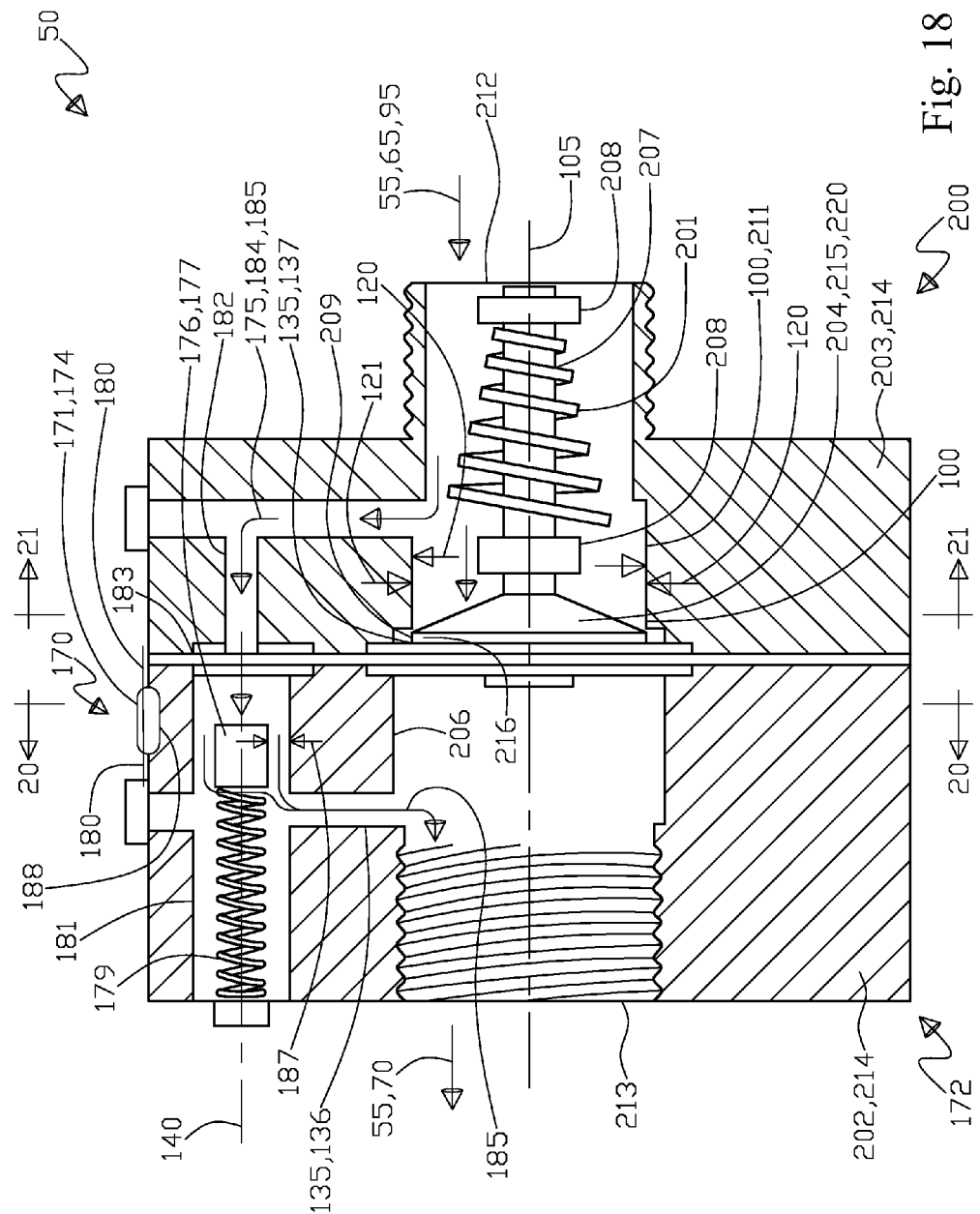
FIG. 18 shows a cross section view of the combination integrated flow sensor and check valve wherein the check valve is in the closed state with the flow sensor magnet in the open state corresponding to the magnetic switch being in the closed state, also shown are the magnet spring more compressed, the check valve spring less compressed, the rod, the poppet, and the axial guides, the primary fluid flow line and the secondary fluid flow line all within the single housing.

Next, FIG. 18 shows a cross section view of the combination 172 integrated flow sensor 170 and check valve 200 wherein the check valve 200 is in the closed state 215 with the flow sensor 170 magnet 176 in the open state 177 corresponding to the magnetic switch 171 being in the closed state 174. Also shown in FIG. 18 are the magnet 176 spring 179 more compressed, the check valve 200 spring 201 less compressed, the rod 207, the poppet 204, and the axial guides 208, the primary fluid flow line 100 and the secondary fluid flow line 135 all within the single housing 202,203.

Figure 19:
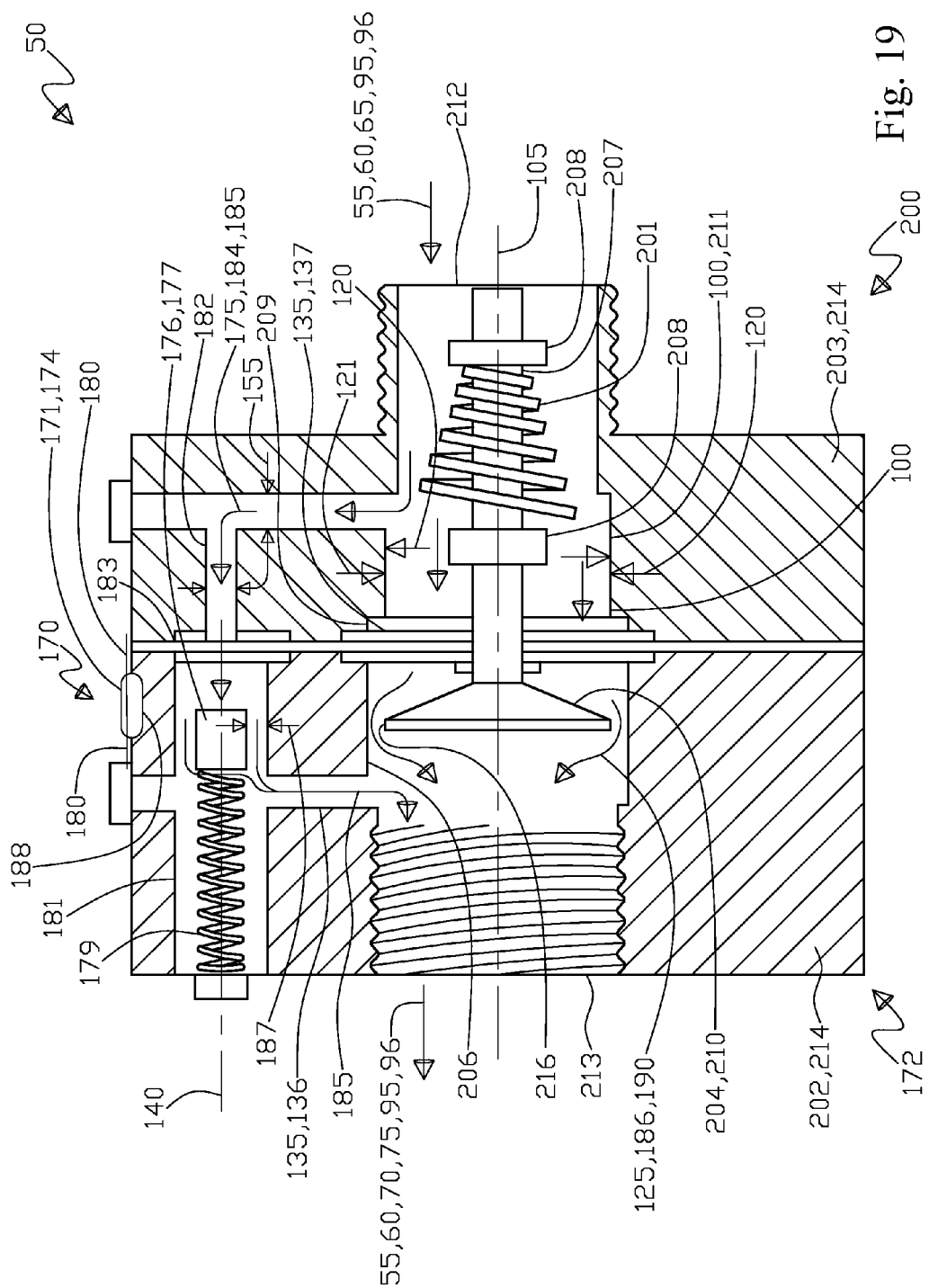
FIG. 19 shows a cross section view of the combination integrated flow sensor and check valve wherein the check valve is in the open state with the flow sensor magnet in the open state corresponding to the magnetic switch being in the closed state, also shown are the magnet spring more compressed, the check valve spring more compressed, the rod, the poppet, and the axial guides, the primary fluid flow line and the secondary fluid flow line all within the single housing.

Further, FIG. 19 shows a cross section view of the combination 172 integrated flow sensor 170 and check valve 200 wherein the check valve 200 is in the open state 210 with the flow sensor 170 magnet 176 in the open state 177 corresponding to the magnetic switch 171 being in the closed state 174. Also shown in FIG. 19 are the magnet 176 spring 179 more compressed, the check valve 200 spring 201 more compressed, the rod 207, the poppet 204, and the axial guides 208, the primary fluid flow line 100 and the secondary fluid flow line 135 all within the single housing 202, 203.

Figure 20:
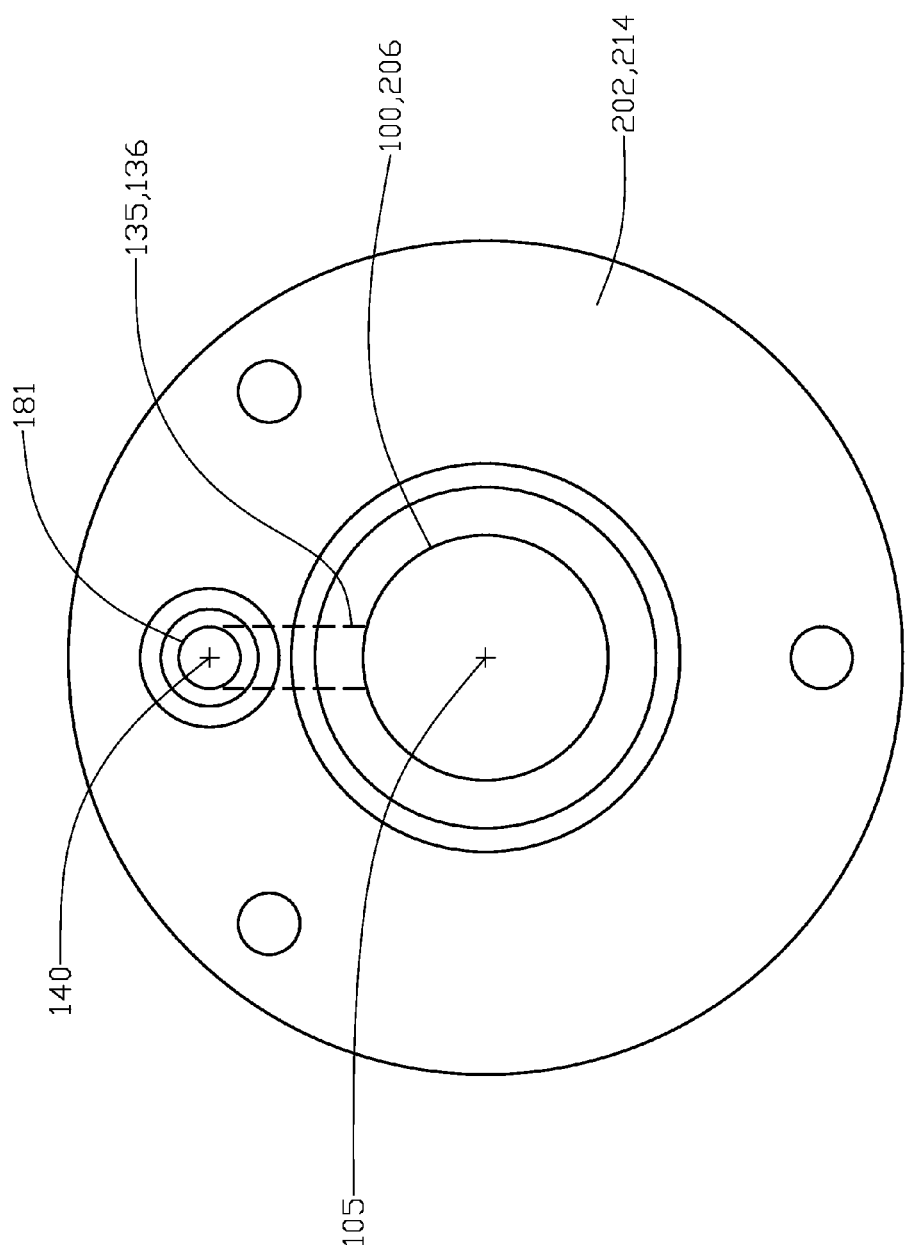
FIG. 20 shows a cross section view 20-20 from FIG. 17 showing an end view of section A of the housing of the combination integrated flow sensor and check valve with a flow sensor magnet bore plus an outlet bore of the check valve, the primary fluid flow line and the secondary fluid flow line all within a single housing.
Figure 21:
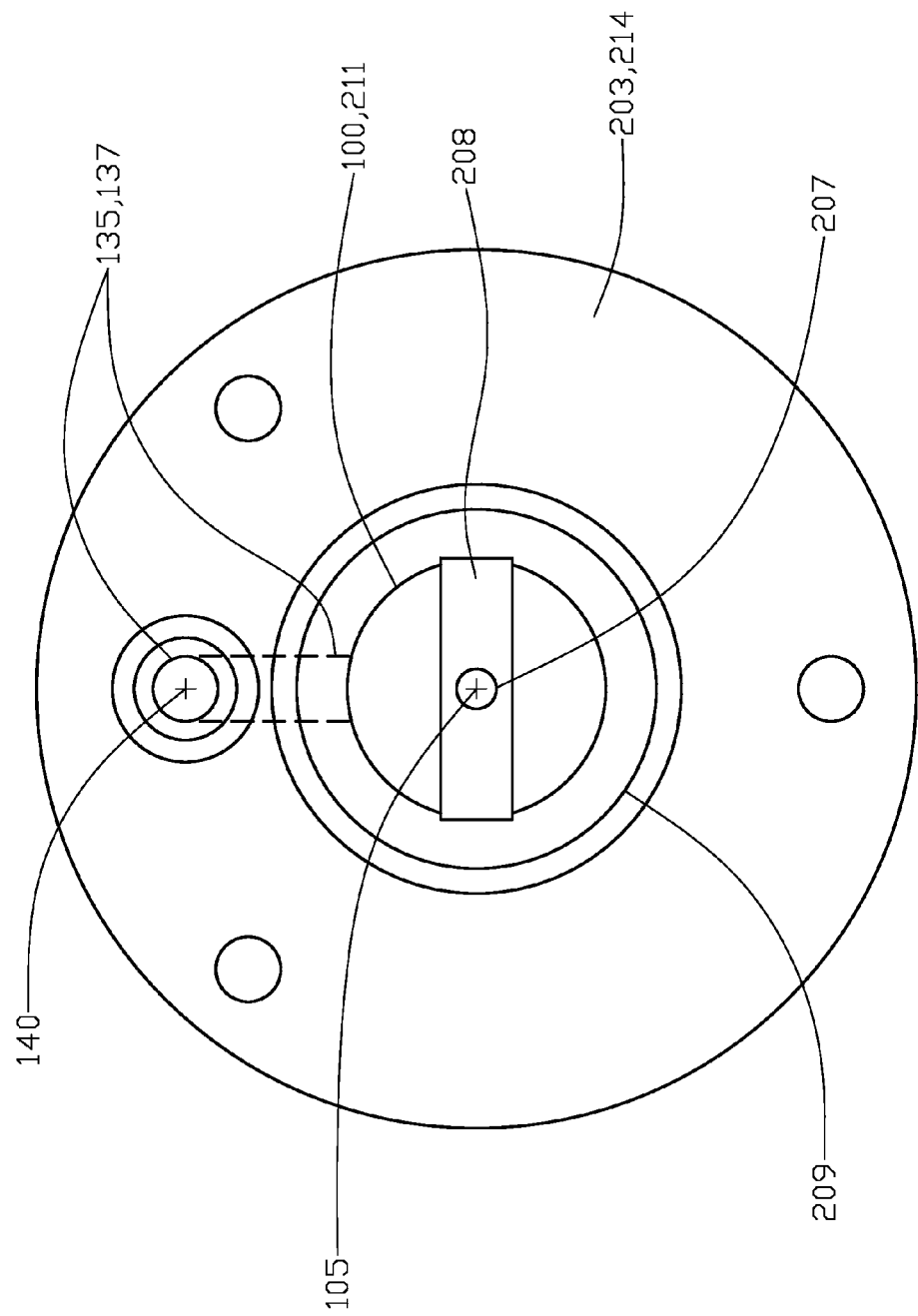
FIG. 21 shows a cross section view 21-21 from FIG. 17 showing an end view of section B of the housing of the combination integrated flow sensor and check valve with a flow sensor inlet shown plus an inlet bore of the check valve, a poppet seat of the check valve, a rod of the check valve, an axial guide of the check valve, and the primary fluid flow line and the secondary fluid flow line all within a single housing.

Moving onward, FIG. 20 shows a cross section view 20-20 from FIG. 17 showing an end view of section A of the housing 202 of the combination 172 integrated flow sensor 170 and check valve 200 with a flow sensor 170 magnet 176 bore 181 outlet 136 plus an outlet bore 206 of the check valve 200, the primary fluid flow line 100 and the secondary fluid flow line 135 all within a single housing 202, 203. In addition, FIG. 21 shows a cross section view 21-21 from FIG. 17 showing an end view of section B of the housing 203 of the combination integrated 172 flow sensor 170 and check valve 200 with a flow sensor 170 inlet 137 shown plus an inlet bore 211 of the check valve 200, a poppet 204 seat 209 of the check valve 200, the rod 207 of the check valve 200, the axial guide 208 of the check valve 200, and the primary fluid flow line 100 and the secondary fluid flow line 135 all within a single housing 202, 203.

Broadly, in referring to FIGS. 1 to 4 and FIGS. 17 to 21, the fluid leak detection and shutdown apparatus 50 for a fluid distribution system 55 having the total fluid distribution system flow rate 60, with the fluid distribution system 55 having the inlet 65 and the outlet 70. The fluid leak detection and shutdown apparatus 50 includes the solenoid shutoff valve 80 having the valve 80 inlet 86 and an opposing valve 80 outlet 87 along the longitudinal axis 85, see especially FIGS. 1 and 2. The solenoid shutoff valve 80 having a flow capacity substantially matched to the total fluid distribution system flow rate 60, the solenoid shutoff valve 80 is adapted to be in fluid communication downstream from the fluid distribution system inlet 65, with the solenoid shutoff valve 80 having an open operational state that allows fluid flow therethrough and a closed operational state that substantially precludes fluid flow therethrough. The solenoid shutoff valve 80 having a default deactivated position of being in the open operational state and the solenoid shutoff valve 80 having an activated position of being in the closed operational state.

Looking in particular at FIGS. 17 to 21, plus FIGS. 1 and 2, the housing 214 is positioned about the longitudinal axis 85, wherein the housing has a housing 214 inlet 212 and an oppositely disposed housing 214 outlet 213 both along the longitudinal axis 85, see FIGS. 17 to 19. Wherein the housing 214 inlet 212 is in fluid communication with the valve 80 outlet 87 and the housing 214 outlet 213 is in fluid communication with the fluid distribution system inlet 65, the longitudinal axis 85 fluid communication path that includes the solenoid shutoff valve 80 and the housing 214 forms the primary fluid flow line 100 having the lengthwise axis 105 that is co-incident to the longitudinal axis 85, see FIGS. 17 to 19 and FIG. 3. The primary fluid flow line 100 having a primary fluid flow line cross sectional flow area 120 associated with the primary fluid flow rate 125, the housing 214 having the housing 214 inlet bore 211 extending inward from the housing 214 inlet 212 and the housing 214 having the housing 214 outlet bore 206 extending inward from the housing 214 outlet 213 wherein the circumferential stepped seat 209 is formed at an interface of the housing 214 inlet bore 211 and the housing 214 outlet bore 206 that are in fluid communication with one another, see in particular FIGS. 17 to 19.

Further the housing 214 has the inlet magnet bore 182 that is positioned about the long axis 140 that is parallel to and offset from the lengthwise axis 105, wherein the inlet magnet bore 182 is in fluid communication with the secondary fluid flow line 135 defined as the flow sensor 170 inlet 137 that is in fluid communication with the housing 214 inlet bore 211, again see FIGS. 17 to 19. The housing 214 further has the outlet magnet bore 181 that is positioned about the long axis 140 that is parallel to and offset from the lengthwise axis 105, the outlet magnet bore 181 is in fluid communication with the secondary fluid flow line 135 defined as the flow sensor outlet 136 that is in fluid communication with the housing 214 outlet bore 206, wherein the circumferential stepped shoulder 183 is formed at an interface of the inlet magnet bore 182 and the magnet outlet bore 181 that are in fluid communication with one another, again see FIGS. 17 to 19.

The housing 214 further includes the poppet 204 in the form of a disc wherein the poppet has an outer periphery 216 that is removably engaged to the housing stepped seat 209, the poppet 204 has an open operational state 210 wherein the outer periphery 216 is separated from the stepped seat 209 and the closed operational state 215 wherein the outer periphery 216 is in contact with the stepped seat 209, again see FIGS. 17 to 19.

Also included in the housing 214 is the poppet 204 spring 201 is disposed between the poppet 204 and the housing 214 or in particular housing portion 203, wherein the poppet 204 spring 201 urges the outer periphery 216 to be in contact with the stepped seat 209 thus placing the poppet 204 in the closed state 215, wherein operationally the poppet 204 closed state 215 substantially precludes all fluid flow in the primary fluid flow line 100 and the poppet 204 open state 210 allows fluid flow in the primary fluid flow line 100, also see FIGS. 17 to 19.

A further element included in the housing 214 is the magnet 176 that is slidably engaged to the housing 214 outlet magnet bore 181, the magnet 176 having a magnet 176 closed state 178 when the magnet 176 is in contact with the housing 214 shoulder 183 and the magnet 176 having a magnet 176 open state 177 when the magnet 176 is separated from the housing shoulder 183, see FIGS. 17 to 19.

Continuing, another element for the housing 214 is the magnet 176 spring 179 that is disposed between the magnet 176 and the housing 214, wherein the magnet 176 spring 179 urges the magnet 176 to be in contact with the housing 214 shoulder 183 thus placing the magnet 176 in the closed state 178, wherein operationally the magnet 176 closed state 178 substantially precludes all fluid flow in the secondary fluid flow line 135 and the magnet 176 open state 177 allows fluid flow in the secondary fluid flow line 135, see FIGS. 17 to 19.

Further, another element for the housing 214 is the magnetic switch 171 that is affixed 188 to the housing 214 such that the magnetic switch 171 is placed into an open state 173 when the magnet 176 is in the closed state 178 and the magnetic switch 171 is placed into the closed state 174 when the magnet 176 is in the open state 177, as best seen in FIGS. 17 to 19. Wherein operationally, the poppet 204 when in the closed state 215 diverts all initial fluid flow 95 from the housing 214 inlet 212 primary fluid flow line 100 to the secondary fluid flow line 135 to create pressure force against the magnet 176 and the magnet 176 spring 179 urging while the magnet 176 is in the closed state 178, when a first threshold 184 secondary fluid flow line 135 low flow rate is achieved (indicating undesirable leakage downstream of the article 75) the magnet 176 spring 179 urging is overcome moving the magnet 176 from the closed state 178 to the magnet 176 open state 177 thus placing the magnet switch 171 from the open state 173 to the closed state 174 to create the flow sensor 170 perceptible output 180, see FIGS. 7 to 19. Wherein when the housing 214 inlet 212 primary fluid flow line 100 reaches the second threshold 186 primary fluid flow line 100 flow rate the poppet 204 goes from the poppet 204 closed state 215 to the poppet 204 open state 210 to allow fluid communication therethrough the primary fluid flow line 100 housing 214 to the housing 214 outlet 213, again see FIGS. 17 to 19.

In addition, another element for the housing 214 is the means 195 for activating the solenoid shutoff valve 80 based on the flow sensor 170 perceptible output 180 as previously described. Optionally for the fluid leak detection and shutdown apparatus 50 the magnet 176 to housing 214 outlet magnet bore 181 slidable engagement has a clearance 187 as between the magnet 176 and the housing 214 outlet magnet bore 181 of about twenty-five (25%) of a magnet 176 dimension perpendicular to the long axis 140, as best seen in FIGS. 17 to 19.

Another alternative for the fluid leak detection and shutdown apparatus 50 wherein the magnet 176 spring 179 is equal to or less than in size to said magnet 176 dimension perpendicular to the long axis 140 to operationally remove the magnet 176 spring 179 from impeding said first threshold 184 secondary fluid flow line 135 low flow rate around the magnet 176, see FIGS. 18 and 19.

Broadly, the present invention of the fluid leak detection and shutdown apparatus 50 is for the fluid distribution system 55 having a total fluid distribution system flow rate 60, the fluid distribution system having an inlet 65 and an outlet 70 is disclosed, see in particular FIGS. 1 and 2 for the physical arrangement, FIGS. 3, 4, and 7 for the summary block diagram arrangement, and FIGS. 17 to 21 for the check valve and flow sensor module 172. The fluid leak detection and shutdown apparatus 50 includes a solenoid shutoff valve 80 having a longitudinal axis 85, the solenoid shutoff valve 80 having a flow capacity substantially matched to the total fluid distribution system 55 flow rate 60, the solenoid shutoff valve 80 is adapted 90 to be in fluid communication downstream from the fluid distribution system 55 inlet 65, again see FIGS. 1 and 2 in particular.

The solenoid shutoff valve 80 having an open operational state that allows fluid flow 95 therethrough and a closed operational state that substantially precludes fluid flow 95 therethrough, the solenoid shutoff valve 80 having a default position of being in the open operational state (NO=normally open) and the solenoid shutoff valve 80 having an activated position of being in the closed operational state. The solenoid shut off valve 80 is preferably as identified in the reference number list, or being a suitable equivalent for the particular fluid distribution system 55 application of pressure, temperature, and type of fluid. A battery backup can be utilized to keep the solenoid shutoff valve 80 in its above described normal operation in the event of utility electrical power loss, wherein if the solenoid shutoff valve 80 losses electrical power it will stay in the open operational state, again see FIGS. 1 and 2.

Also included in the fluid leak detection and shutdown apparatus 50 is a primary fluid flow line 100 having a lengthwise axis 105, the primary fluid flow line 100 is in downstream fluid communication 110 with the solenoid shutoff valve 80, the primary fluid flow line 100 also being in upstream fluid communication 115 with the fluid distribution system 55 outlet 70, see FIGS. 1 and 2. The primary fluid flow line 100 having a primary fluid flow line 100 cross sectional flow area 120 associated with a primary fluid flow rate 125, with the lengthwise axis 105 being coincident to the longitudinal axis 85, again see FIGS. 1, 2, and 17 to 21. The preferred cross sectional area 120 is about 0.72 inches squared based upon a 1 inch nominal size schedule 80 PVC pipe with an internal diameter 121 of about 0.96 inches and an outside diameter 122 of about 1.315 inches, however, other piping sizes could be employed as required.

Further included in the fluid leak detection and shutdown apparatus 50 is a check valve 200 in fluid communication 205 with the primary fluid flow line 100, wherein the check valve 200 allows fluid flow 210 from the solenoid shutoff valve 80 to the fluid distribution system outlet 70. The check valve 200 substantially preventing fluid flow 215 from the fluid distribution system outlet 70 to the solenoid shutoff valve 80, plus the check valve 200 substantially preventing flow 220 from the primary fluid flow line 100 adjacent to the outlet 70 to the flow sensor 170 inlet 182, the check valve 200 including an opening spring 201 being preferably as described in the reference number list, with a spring rate that is sufficient to create a calibrated crack open force, see FIGS. 1, 2, and 17 to 21.

Further included in the fluid leak detection and shutdown apparatus 50 is a secondary fluid flow line 135 having a long axis 140, the secondary fluid flow line 135 is in downstream fluid communication 145 with the solenoid shutoff valve 80, the secondary fluid flow line 135 also being in upstream fluid communication 150 with the fluid distribution system 55 outlet 70, see FIGS. 1, 2, and 3. The secondary fluid flow line 135 having a secondary fluid flow line 135 cross sectional flow area associated with a secondary fluid flow rate 160, wherein the secondary fluid flow line 135 cross sectional flow area 155 is less than the primary fluid flow line 100 cross sectional flow area 120 such that the secondary fluid flow rate 160 or the first threshold flow rate 184 in the secondary fluid flow line 135 is less than the primary fluid flow rate 125 or the second threshold flow rate 186 of the primary fluid flow line 100, a portion of the secondary fluid flow line 135 long axis 140 being perpendicular 130 to the longitudinal axis 85 and the coincident lengthwise axis 105, see FIGS. 3 and 17 to 21. The preferred cross section area 155 is about 0.028 inches squared based upon about a ¼ inch nominal size passageway, however, other sizes could be employed as required, subject to the requirement that the secondary fluid flow line 135 cross sectional flow area 155 is less than the primary fluid flow line 100 cross sectional flow area 120, as given in the preferences above, see in particular FIGS. 17 to 21.

Yet further included in the fluid leak detection and shutdown apparatus 50 is a flow sensor 170 in fluid communication 175 with the secondary fluid flow line 135, the flow sensor 170 having a perceptible output 180, wherein the flow sensor 170 has a flow sensing flow rate capacity that is less than the solenoid shutoff valve 80 flow capacity, see FIGS. 1, 2, 3, and 17 to 21. Wherein operationally the flow sensor 170 receives a portion 185 of the solenoid shutoff valve 80 flow capacity in priority over the primary fluid flow line 100 that receives a remaining portion 190 of the solenoid shutoff valve 80 flow capacity, thus allowing the flow sensor 170 to detect minimal flow rates, see FIGS. 1, 2, 3, and 17 to 21. Plus also included in the fluid leak detection and shutdown apparatus 50 has a means 195 for activating the solenoid shutoff valve 80 based on the flow sensor 170 perceptible output 180, see FIGS. 1 through 16. The flow sensor 170 is preferably as being described in the reference numbers list being capable down to about 0.3 gallons per minute in the ability to create the perceptible output 180, wherein the perceptible output 180 is preferably a magnetic flow switch 171 or a suitable equivalent, see FIGS. 17 to 19.

The integral check valve 200 also can be operational to further help cause fluid flow 95 to divert first to the flow sensor 170, thus allowing the flow sensor 170 to pick up a smaller earlier leakage i.e. the first threshold flow rate 184 thus activating the perceptible output 180 via placing the magnet switch 171 in the closed state 174, prior to the check valve 200 cracking open against its preferred 5 pound spring 201, see in particular in going from FIG. 18 to FIG. 19, wherein the fluid flow 95 will increase to fluid flow rate 60 as required by the fluid distribution system 55 once the spring 201 cracks open thus allowing the check valve 200 to flow, see FIG. 19. The opening spring 201 has the crack open force being between about five (5) pounds to about six and one-half (6½) pounds.

Further, on the fluid leak detection and shutdown apparatus 50 the means 195 for activating the solenoid shutoff valve 80 further includes timing circuitry 225, 230, plus switch 390, resistors 370, 375, 365, 435, 440, 445, 450, 455, 460, 465, 470, 475, and 480, also capacitors 310, voltage regulator 405 and chip 305, all as schematically arranged in FIGS. 13-A, 13-B and 14-A, 14-B, as physically shown in FIGS. 1, 2, and 3, plus further as block diagrams shown in FIGS. 7 through 11. The switch 390 is operable upon selectable activation 225, 230 to set a discrete time delay signal to pin 27 of the chip 305 and control circuitry in the chip 305 that is operative to monitor the discrete time delay signal after the flow sensor 170 signal 180 from the flow sensor 170 perceptible output 180. Wherein the control circuitry chip 305 will send an activation signal 235 from chip 305 pin 9 to activate the solenoid shutoff valve 80 into the closed operational state after the selected time delay.

Looking at FIG. 15 for the control circuitry chip 305 outputs for the valve 80 includes using the power supply 272 being from pin 9 of the chip 305 using resistors 365, 380 and transistor 400 with transient voltage suppressors 315 and transistor 325 connecting 235 to the valve 80 to activate the valve 80 into the closed operational state or to deactivate the valve 80 into the open operational state.

Wherein the time setting 270 and 273 is determined from the article 75 cumulative time flow usage, typically in a low flow rate, as an example the articles 75 would include refrigerator ice makers, ice machines, chilled water dispensers, humidifiers, evaporative coolers, hot water heater makeup, and the like that will use small amounts of water on a temporary basis, and as such would give rise to the flow sensor 170 generating a perceptible output 180 for a short time period, thus the time setting 270 and 273 would account for these article 75 usages and not activate 285 the solenoid valve 80 based upon article 75 usage, wherein activation 285 would only occur for a major fluid distribution system 55 leak, for instance while the home owner was away from their residence for an extended period, thus the activation 285 would prevent major water damage for an unexpected pipe or valve failure or the like that would be outside of these normal article 75 usages and thus exceeding the selected time delay 225, 230.

Optionally of the fluid leak detection and shutdown apparatus 50 the means 195 for activating the solenoid shutoff valve 80 can further include temperature sensing circuitry originating at thermistor 425 that is positioned adjacent to the solenoid shutoff valve 80 to preferably protect the valve 80 and flow sensor 170 from for instance below freezing temperatures in a fluid application of water. The temperature sensing circuitry which is shown as an input in FIG. 14-A that includes capacitors 310, resistors 370, 375, transistor 330, and voltage regulator 405, all as schematically arranged in FIG. 14-A, wherein the temperature signal connects to pin 24 of chip 305 in FIG. 13-A, the temperature sensor 425 is also shown as a flow diagram in FIGS. 8 through 12. The generation of a temperature signal is a chip 305 pin 3 signal to the error circuitry with resistor 380 and light 340 upon reaching a predetermined temperature set-point with the control circuitry 305 that is operative to monitor the temperature signal at chip 305 pin 24, wherein the control circuitry 305 will send an error 340 perceptible output upon the temperature signal from the temperature set point, as shown in the schematic in FIG. 13-A.

A further option on the fluid leak detection and shutdown apparatus 50 is wherein the means 195 for activating the solenoid shutoff valve 80 can further include fluid leakage sensing 800 circuitry 810 for the fluid leak detection and shutdown apparatus 50, see FIGS. 1, 2, and 3 for the physical arrangement of the fluid leakage sensor 800, 810. The fluid leakage sensing circuitry 800, 810 that generates a leakage signal upon detecting fluid leakage, includes resistors 365 and capacitors 310 as shown in the inputs of FIG. 14-B with the leakage signal continuing to pin 23 of chip 305 for the control circuitry that is operative to monitor said leakage signal, as shown in FIG. 13-A, wherein the control circuitry will send an error perceptible output upon said leakage signal, being preferably done by the generation of a leakage signal on chip 305 pin 3 to the error circuitry with resistor 380 and light 340 upon reaching a predetermined leakage to indicate that attention needs to be given to the fluid leak detection and shutdown apparatus 50.

Another option for the fluid leak detection and shutdown apparatus 50 the means 195 for activating the solenoid shutoff valve 80 further includes modem 500 or cell phone circuitry 515 and the control circuitry 305 pin 38 communication link 525 as shown in the FIG. 13-A schematic and then to the outputs schematic in FIG. 15 that shows the power supply 272 and resistors 365 and 380 with bipolar transistor 400, that is operative to generate a dialer control signal 525 or text message 955 upon activation of the solenoid valve 80. The modem 500 and text message 955 circuitry is best physically shown in FIGS. 1 and 4, wherein the modem 515 is preferably specified in the reference numbers list, wherein the modem circuitry 515 is operable to receive the dialer control signal 525 control to send a notification or text message 955 via 520 to an external communications system.

Further, on the modem or cell phone 515 the control circuitry 305 that is operative to generate a dialer control signal or text message 955 can upon the control circuitry receiving the temperature signal 425 at pin 24 of the chip 305 or upon the leakage signal 810 at pin 23 of the chip 305, wherein the modem or cell phone circuitry 515 is operable to receive the dialer control signal 525 control to send a notification via 520 to an external communications system based upon temperature 425 error or leakage 800 being present, see FIGS. 1, 4 13-A, and 15.

A further option for the fluid leak detection and shutdown apparatus 50 on the means 195 for activating the solenoid shutoff valve 80 can further include a selectable reset circuit 255 that has a normally open circuit operational state and a selectable momentary closed circuit operational state via switch 395, including capacitor 310 and resister 365, connecting to pin 1 on chip 305, as schematically shown in FIG. 13-A. Wherein operationally, the selectable reset circuit 255 in the closed circuit operational state resets the solenoid shutoff valve 80 from the activated closed state to the deactivated open state. In addition, the selectable reset circuit 255 can also circuit in said closed circuit operational state reset the control circuitry 305 to re-read the temperature signal 425 or the leakage signal 800.

Incorporation by reference to the specification for the source code as follows:

Source code—concurrently submitted as an ASCII text file;
File name (File format): YCRI_REVA1 (C File)
File size (KB) 9.81
File name (File format): YCRI-REVA1 (H File)
File size (KB): 1.67
File creation date: Mar. 4, 2014.
File description: Source code for the controller chip 305.

CONCLUSION

Accordingly, the present invention of a fluid leak detection and shutdown apparatus 50 has been described with some degree of particularity directed to the embodiments of the present invention. It should be appreciated, though; that the present invention is defined by the following claims construed in light of the prior art so modifications or changes may be made to the exemplary embodiments of the present invention without departing from the inventive concepts contained therein.

The invention claimed is:

1. A fluid leak detection and shutdown apparatus for a fluid distribution system having a total fluid distribution system flow rate, said fluid distribution system having an inlet and an outlet, said fluid leak detection and shutdown apparatus comprising:
  (a) a solenoid shutoff valve having a valve inlet and an opposing valve outlet along a longitudinal axis, said solenoid shutoff valve having a flow capacity substantially matched to the total fluid distribution system flow rate, said solenoid shutoff valve is adapted to be in fluid communication downstream from the fluid distribution system inlet, said solenoid shutoff valve having an open operational state that allows fluid flow therethrough and a closed operational state that substantially precludes fluid flow therethrough, said solenoid shutoff valve having a default deactivated position of being in said open operational state and said solenoid shutoff valve having an activated position of being in said closed operational state;
  (b) a housing that is positioned about said longitudinal axis, said housing having a housing inlet and an oppositely disposed housing outlet both along said longitudinal axis, wherein said housing inlet is in fluid communication with said valve outlet and said housing outlet is in fluid communication with the fluid distribution system inlet, a fluid communication path along said longitudinal axis includes said solenoid shutoff valve and said housing that forms a primary fluid flow line having a lengthwise axis that is co-incident to said longitudinal axis, said primary fluid flow line having a primary fluid flow line cross sectional flow area associated with a primary fluid flow rate, said housing having a housing inlet bore extending inward from said housing inlet and said housing having a housing outlet bore extending inward from said housing outlet wherein a circumferential stepped seat is formed at an interface of said housing inlet bore and said housing outlet bore that are in fluid communication with one another, further said housing has an inlet magnet bore that is positioned about a long axis that is parallel to and offset from said lengthwise axis, said inlet magnet bore is in fluid communication with a secondary fluid flow line defined as a flow sensor inlet that is in fluid communication with said housing inlet bore, said housing further has an outlet magnet bore that is positioned about said long axis that is parallel to and offset from said lengthwise axis, said outlet magnet bore is in fluid communication with a secondary fluid flow line defined as a flow sensor outlet that is in fluid communication with said housing outlet bore, wherein an circumferential stepped shoulder is formed at an interface of said inlet magnet bore and said magnet outlet bore that are in fluid communication with one another;
  (c) a poppet in the form of a disc wherein said poppet has an outer periphery that is removably engaged to said housing stepped seat, said poppet has a poppet open operational state wherein said outer periphery is separated from said stepped seat and a poppet closed operational state wherein said outer periphery is in contact with said stepped seat;
  (d) a poppet spring disposed between said poppet and said housing, wherein said poppet spring urges said outer periphery to be in contact with said stepped seat thus placing said poppet in said poppet closed operational state, wherein operationally said poppet closed operational state substantially precludes all fluid flow in said primary fluid flow line and said poppet open operational state allows fluid flow in said primary fluid flow line;
  (e) a magnet that is slidably engaged to said housing outlet magnet bore, said magnet having a magnet closed state when said magnet is in contact with said housing shoulder and said magnet having a magnet open state when said magnet is separated from said housing shoulder,
  (f) a magnet spring disposed between said magnet and said housing, wherein said magnet spring urges said magnet to be in contact with said housing shoulder thus placing said magnet in said magnet closed state, wherein operationally said magnet closed state substantially precludes all fluid flow in said secondary fluid flow line and said magnet open state allows fluid flow in said secondary fluid flow line;
  (g) a magnetic switch that is affixed to said housing such that said magnetic switch is placed into a magnetic switch open state when said magnet is in said magnet closed state and said magnetic switch is placed into a magnetic switch closed state when said magnet is in said magnet open state, wherein operationally said poppet in said poppet closed operational state diverts all initial fluid flow from said housing inlet primary fluid flow line to said secondary fluid flow line to create pressure force against said magnet and said magnet spring urging while said magnet is in said magnet closed state, when a first threshold secondary fluid flow line low flow rate is achieved said magnet spring urging is overcome moving said magnet from said magnet closed state to said magnet open state thus placing said magnetic switch from said magnetic switch open state to said magnetic switch closed state to create a flow sensor perceptible output, wherein when said housing inlet primary fluid flow line reaches a second threshold primary fluid flow line high flow rate said poppet goes from said poppet closed state to said poppet open state to allow fluid communication therethrough said primary fluid flow line from said housing inlet to said housing outlet; and
  (h) a means for activating said solenoid shutoff valve based on said flow sensor perceptible output.

2. A fluid leak detection and shutdown apparatus according to claim 1 wherein said magnet to housing outlet magnet bore slidable engagement has a clearance as between said magnet and said housing outlet magnet bore of about twenty-five (25%) of a magnet dimension perpendicular to said long axis.

3. A fluid leak detection and shutdown apparatus according to claim 2 wherein said magnet spring is equal to or less than in size to said magnet dimension perpendicular to said long axis to operationally remove said magnet spring from impeding said first threshold secondary fluid flow line low flow rate around said magnet.

4. A fluid leak detection and shutdown apparatus according to claim 1 wherein said means for activating said solenoid shutoff valve further includes timing circuitry that is operable upon selectable activation to set a discrete time delay signal and control circuitry that is operative to monitor said discrete time delay signal after a flow sensor signal from said flow sensor perceptible output, wherein said control circuitry will send an activation signal to activate said solenoid shutoff valve into said closed operational state after said time delay.

5. A fluid leak detection and shutdown apparatus according to claim 4 wherein said means for activating said solenoid shutoff valve further includes temperature sensing circuitry adjacent to said solenoid shutoff valve that generates a temperature signal upon reaching a temperature set-point and control circuitry that is operative to monitor said temperature signal, wherein said control circuitry will send an error perceptible output upon said temperature signal.

6. A fluid leak detection and shutdown apparatus according to claim 4 wherein said means for activating said solenoid shutoff valve further includes fluid leakage sensing circuitry disposed on said fluid leak detection and shutdown apparatus, said fluid leakage sensing circuitry that generates a leakage signal upon detecting fluid leakage and control circuitry that is operative to monitor said leakage signal, wherein said control circuitry will send an error perceptible output upon said leakage signal.

7. A fluid leak detection and shutdown apparatus according to claim 4 wherein said means for activating said solenoid shutoff valve further includes modem circuitry and control circuitry that is operative to generate a dialer control signal upon said activation of said solenoid valve, wherein said modem circuitry is operable to receive said dialer control signal control to send a notification to an external communications system.

8. A fluid leak detection and shutdown apparatus according to claim 4 wherein said means for activating said solenoid shutoff valve further includes temperature sensing circuitry adjacent to said solenoid shutoff valve that generates a temperature signal upon reaching a temperature set-point and control circuitry that is operative to monitor said temperature signal, wherein said control circuitry will send an error perceptible output upon said temperature signal and said means for activating said solenoid shutoff valve further includes fluid leakage sensing circuitry disposed on fluid leak detection and shutdown apparatus, said fluid leakage sensing circuitry that generates a leakage signal upon detecting fluid leakage and control circuitry that is operative to monitor said leakage signal, wherein said control circuitry will send an error perceptible output upon said leakage signal.

9. A fluid leak detection and shutdown apparatus according to claim 8 wherein said means for activating said solenoid shutoff valve further includes modem circuitry and control circuitry that is operative to generate a dialer control signal upon said control circuitry receiving said temperature signal or said leakage signal, wherein said modem circuitry is operable to receive said dialer control signal control to send a notification to an external communications system.

10. A fluid leak detection and shutdown apparatus according to claim 4 wherein said means for activating said solenoid shutoff valve further includes a selectable reset circuit that has a normally open circuit operational state and a selectable momentary closed circuit operational state, wherein operationally said selectable reset circuit in said closed circuit operational state resets said solenoid shutoff valve from said activated state to said deactivated state.

11. A fluid leak detection and shutdown apparatus according to claim 8 wherein said means for activating said solenoid shutoff valve further includes a selectable reset circuit that has a normally open circuit operational state and a selectable momentary closed circuit operational state, wherein operationally said selectable reset circuit in said closed circuit operational state resets said control circuitry to re-read said temperature signal or said leakage signal.

12. A fluid leak detection and shutdown apparatus according to claim 8 wherein said means for activating said solenoid shutoff valve further includes cell phone circuitry and control circuitry that is operative to generate a text signal upon said control circuitry receiving said temperature signal or said leakage signal, wherein said cell phone circuitry is operable to receive said text to send a notification to an external communications system.

* * * * *